United States Patent [19]

Yamagata et al.

[11] Patent Number: 5,379,158
[45] Date of Patent: Jan. 3, 1995

[54] RECORDING AND/OR REPRODUCING APPARATUS WITH CHANGEABLE NUMBER OF RECORDED PICTURES PER UNIT OF TIME

[75] Inventors: Shigeo Yamagata; Yasutomo Suzuki; Masahiro Takei, all of Kanagawa, Japan

[73] Assignee: Canon Kabushiki Kaisha, Tokyo, Japan

[21] Appl. No.: 231,370

[22] Filed: Apr. 19, 1994

Related U.S. Application Data

[63] Continuation of Ser. No. 921,423, Jul. 28, 1992, abandoned, which is a continuation of Ser. No. 517,395, Apr. 30, 1990, abandoned, which is a continuation of Ser. No. 7,374, Jan. 27, 1987, abandoned.

[30] Foreign Application Priority Data

| | | |
|---|---|---|
| Jan. 31, 1986 | [JP] Japan | 61-020507 |
| Jan. 31, 1986 | [JP] Japan | 61-020508 |
| Jan. 31, 1986 | [JP] Japan | 61-020509 |
| Jan. 31, 1986 | [JP] Japan | 61-020510 |
| Jan. 31, 1986 | [JP] Japan | 61-020511 |
| Jan. 31, 1986 | [JP] Japan | 61-020512 |
| Jan. 31, 1986 | [JP] Japan | 61-020513 |
| Jan. 31, 1986 | [JP] Japan | 61-020514 |

[51] Int. Cl.⁶ .................................................. H04N 5/78
[52] U.S. Cl. .................................... 360/9.1; 360/35.1; 358/335
[58] Field of Search ............. 360/35.1, 10.3, 9.1, 360/10.1; 358/906, 330, 335, 213.25, 213.26, 213.28, 909.1

[56] References Cited

U.S. PATENT DOCUMENTS

| | | | |
|---|---|---|---|
| 3,636,253 | 1/1972 | Notani et al. | 360/35.1 |
| 4,007,490 | 2/1977 | Shoda | 360/35.1 X |
| 4,499,509 | 2/1985 | Gohda et al. | 370/72.1 |
| 4,584,613 | 4/1986 | Amari et al. | 360/10.3 X |
| 4,604,668 | 8/1986 | Lemelson | 360/10.1 |
| 4,658,319 | 4/1987 | Tripp et al. | 360/33.1 X |
| 4,714,966 | 12/1987 | Saito et al. | 358/906 X |
| 4,739,417 | 4/1988 | Ogawa | 358/906 X |
| 4,740,828 | 4/1988 | Kinoshita | 358/906 X |
| 4,772,962 | 9/1988 | Tanaka et al. | 360/10.1 |
| 4,783,707 | 11/1988 | Nemoto et al. | 358/906 X |
| 5,016,124 | 4/1991 | Fukushima et al. | 360/73.03 X |

Primary Examiner—Andrew L. Sniezek
Attorney, Agent, or Firm—Robin, Blecker Daley & Driscoll

[57] ABSTRACT

A recording and/or reproducing apparatus includes among other functions a recording arrangement which has first and second recording modes, such as field- and frame-recording modes, and is capable of varying the number of picture planes to be recorded per unit time is arranged to control the recording speed setting range to be different between recording speeds for the first recording mode and recording speeds for the second recording modes; and, in the event of setting of a recording speed which can be set for the first recording mode but cannot be set for the second mode, the recording speed is automatically changed to a recording speed which can be set for the second recording mode.

11 Claims, 17 Drawing Sheets

FIG.2

| | | SW2 | SW3 | SW4 | SW5 |
|---|---|---|---|---|---|
| FIELD REPRODUCTION | ODD FIELD | CONNECT HEAD 3-1 TO REPRODUCTION AMP. 6 | INTERMEDIATE POSITION | OUTPUT FROM DEMODULATION CKT 9 | CONNECT MONITOR 13 TO SWITCH SW4 |
| | EVEN FIELD | | | OUTPUT VIA 1/2 H DELAY CKT 10 | |
| FRAME REPRODUCTION | ODD FIELD | CONNECT HEAD 3-1 TO REPRODUCTION AMP. 6 | INTERMEDIATE POSITION | OUTPUT FROM DEMODULATION CKT 9 | |
| | EVEN FIELD | INTERMEDIATE POSITION | CONNECT HEAD 3-2 TO REPRODUCTION AMP. 6 | | |
| FIELD RECORDING | ODD FIELD | CONNECT HEAD 3-1 TO RECORDING AMP. 16 | INTERMEDIATE POSITION | | CONNECT MONITOR 13 TO VIDEO SIGNAL INPUT TERMINAL 18 |
| | EVEN FIELD | | | | |
| FRAME RECORDING | ODD FIELD | CONNECT HEAD 3-1 TO RECORDING AMP. 16 | INTERMEDIATE POSITION | | |
| | EVEN FIELD | INTERMEDIATE POSITION | CONNECT HEAD 3-2 TO RECORDING AMP 16 | | |

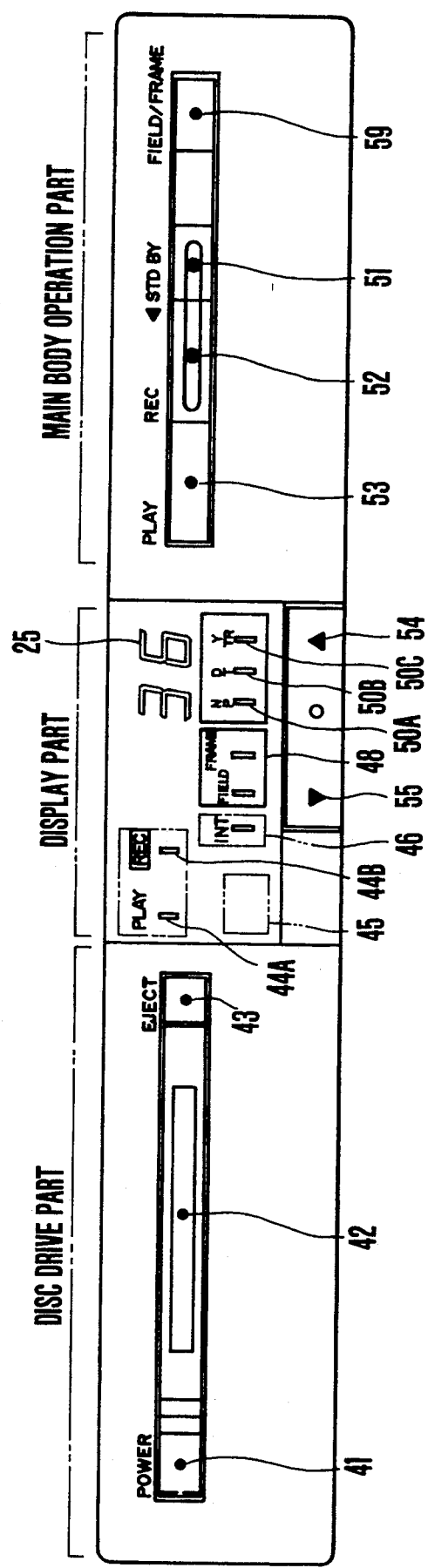

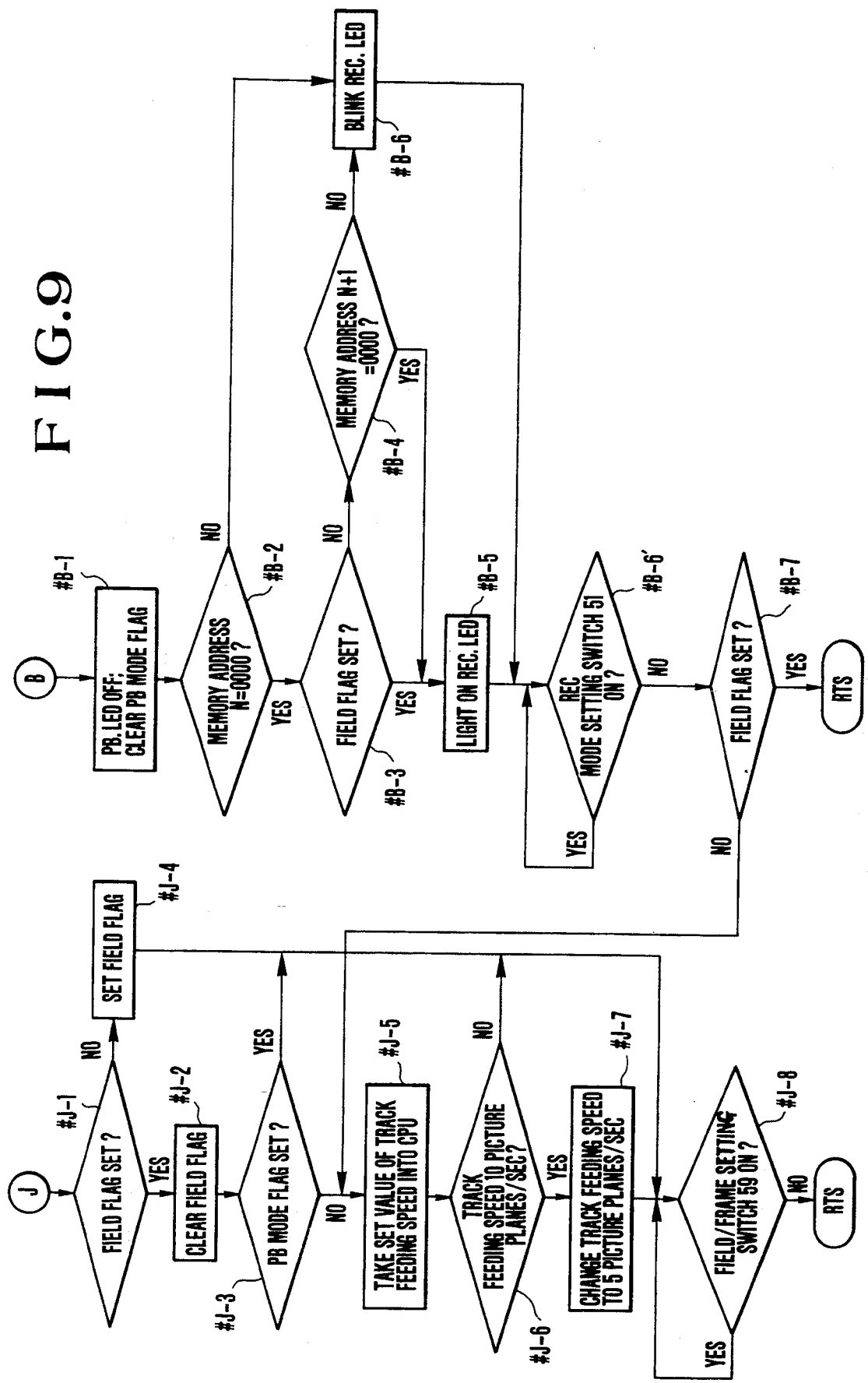

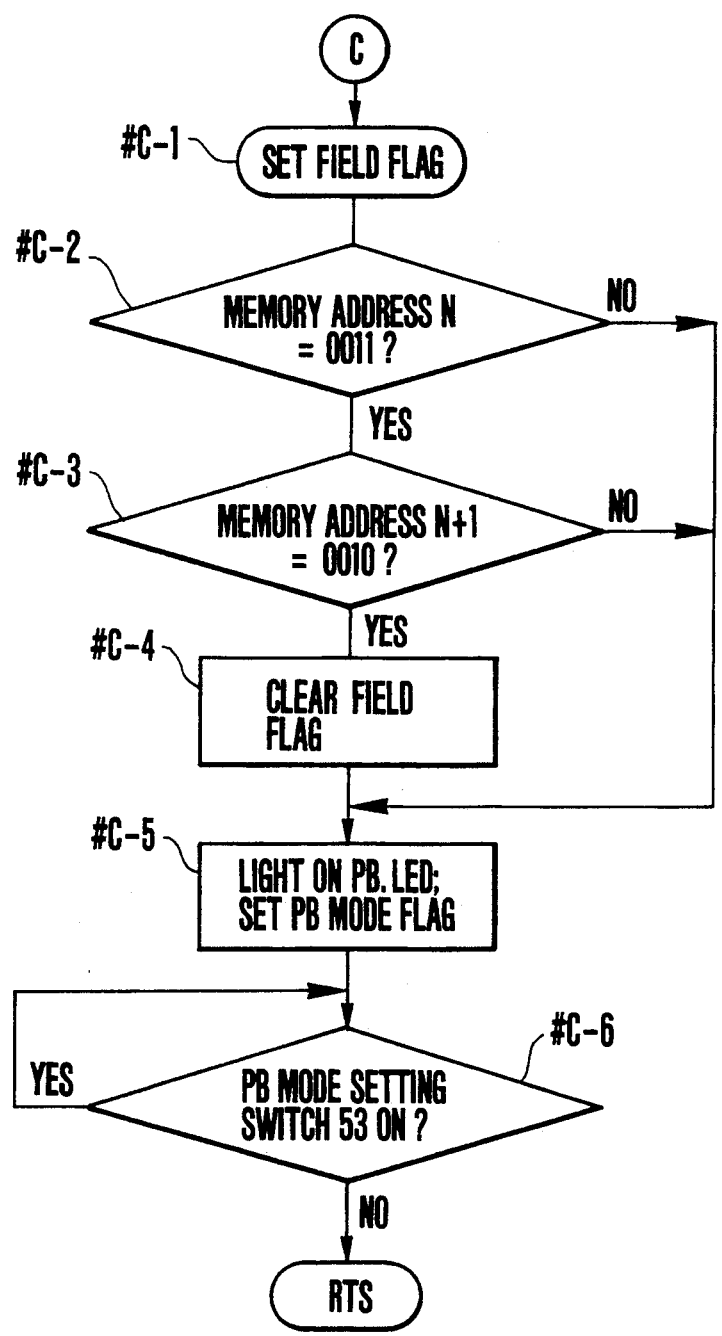

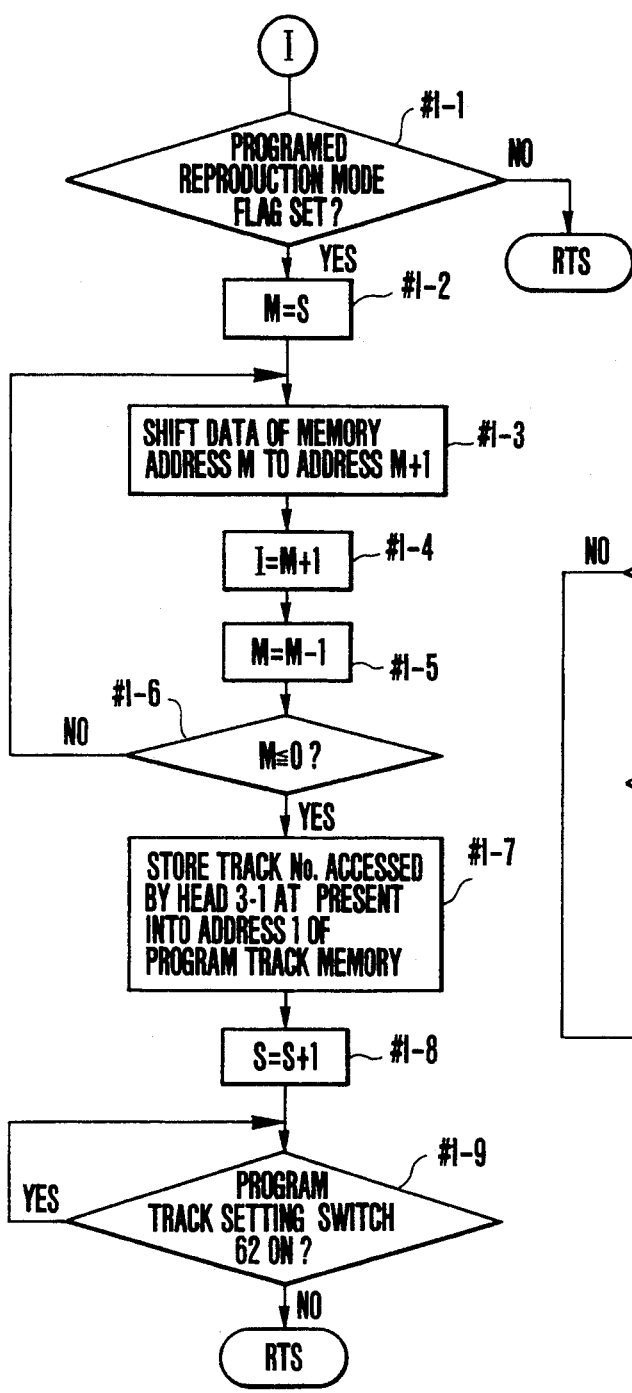
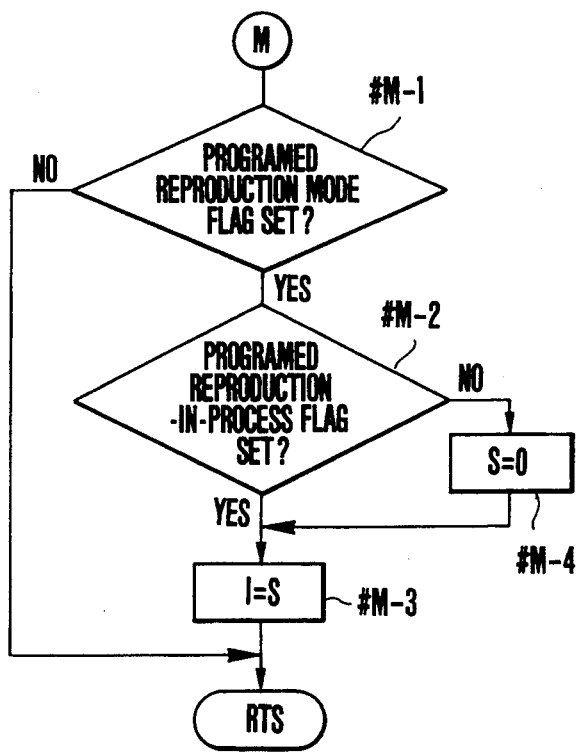
FIG.15
FIG.17

RECORDING AND/OR REPRODUCING APPARATUS WITH CHANGEABLE NUMBER OF RECORDED PICTURES PER UNIT OF TIME

This is a continuation application under 37 CFR 1.62 of prior application Ser. No. 07/921,423, filed Jul. 28, 1992 abandoned, which is a continuation of Ser. No. 07/517,395 filed Mar. 30, 1990 abandoned, which is a continuation of Ser. No. 07/007,374 filed Jan. 27, 1987 abandoned.

BACKGROUND OF THE INVENTION

1. Field of the Invention

This invention relates to a recording and/or reproducing apparatus and more particularly to an apparatus arranged to record and/or reproduce video signals.

2. Description of the Related Art

The known recording apparatus of the recording speed variable kind include apparatuses arranged to record a still picture on a magnetic sheet called an "SV floppy disc." The still picture recording apparatus is arranged to permit setting a number of recordable still pictures, for example, at two, five or ten picture planes.

In case that the recording apparatus of this type is arranged to permit selection of either a frame recording mode in which a frame video signal consisting of two interlaced fields and a field recording mode in which a field video signal consisting of a single field is recorded, the variable recording speed range of the field recording mode differs from that of the frame recording mode. Therefore, a recording speed set for the field recording mode is not always adaptable for the frame recording mode. This problem has been encountered in general by recording apparatuses of the kind having first and second recording modes which have different recordable amounts of information in recording information and arranged to be capable of varying the recording speed from one speed to another.

SUMMARY OF THE INVENTION

It is a first object of this invention to solve the above stated problem in a recording apparatus which has first and second recording modes for different recordable amounts of information and has variable recording speeds.

Under this object, a recording apparatus arranged as a preferred embodiment thereof is provided with control means for differentiating the recording speed setting range of the above stated first recording mode from that of the second recording mode.

Further, in this embodiment, where the first recording mode is changed over to the second recording mode when the recording speed is set at such a speed that can be set in the first recording mode but not can be set in the second recording mode, the set recording speed is automatically changed to another recording speed which can be set in the second mode.

It is a second object of this invention to provide a reproducing apparatus which is capable of permitting adequate setting of a reproducing sequence in setting a programed reproduction mode in which the reproducing sequence of information recorded on a medium is preset.

Under that object, a reproducing apparatus which is arranged according to this invention as a preferred embodiment thereof to reproduce information from memory means having the information recorded there in a plurality of blocks comprises: storage means for storing a signal designating a sequence in which the blocks of information are to be reproduced; reproducing means for reproducing the information from the memory means according to the signal stored at the storage means; and control means which, in storing the reproducing sequence designating signal at the storage means, ensures that the recorded information is reproduced by the reproducing means from a record block according to the designating signal.

It is a third object of this invention to provide a reproducing apparatus having a mode in which reproduction is performed while the reproducing position is automatically changed at predetermined time intervals, wherein the reproducing position can be manually changed as desired during the process of automatic reproduction; and, after the manual change, reproduction is again performed by automatically changing the reproducing positions.

To attain this object, a reproducing apparatus arranged as a preferred embodiment thereof comprises: memory means for having information recorded in a plurality of blocks; signal generating means for generating signals according to a designated reproducing sequence; reproducing means for reproducing the information from the memory means on the basis of the signal from the signal generating means; shift instructing means for generating an instruction to shift the reproducing sequence; and control means which causes the reproducing means to reproduce an information block different from a block currently under reproduction when the shift instruction is generated during the process of reproduction and to come back to perform reproduction again on the basis of the signal from the signal generating means after reproduction is performed from the different block for a predetermined period of time.

It is a fourth object of this invention to provide a recording and/or reproducing apparatus which is, despite of a simple structural arrangement, capable of adequately controlling recording and reproducing timing.

It is a fifth object of this invention to provide a recording and/or reproducing apparatus arranged to record along with a video signal an identification signal showing whether the video signal is recorded in a field recording mode or in a frame recording mode and, in reproduction, to have two field recorded video signals reproduced in the form of a frame picture by automatically detecting the identification signal.

Further objects and features of this invention will become apparent from the following detailed description of embodiments thereof taken in connection with the accompanying drawings.

BRIEF DESCRIPTION OF THE DRAWINGS

FIG. 2 shows in combinations the switching positions of switches SW2 to SW5 shown in FIG. 1.

FIG. 3 is a front view of the same embodiment.

FIGS. 5 to 13 and 15 to 18 are flow charts showing the operation of a CPU 40 shown in FIG. 1.

DETAILED DESCRIPTION OF THE PREFERRED EMBODIMENTS

In an embodiment described below, this invention is applied to a recording and/or reproducing apparatus which is of the kind arranged to record and/or reproduce a still picture video signal on or from a disc shaped recording medium, i.e. a disc-shaped magnetic sheet.

Figure 1:
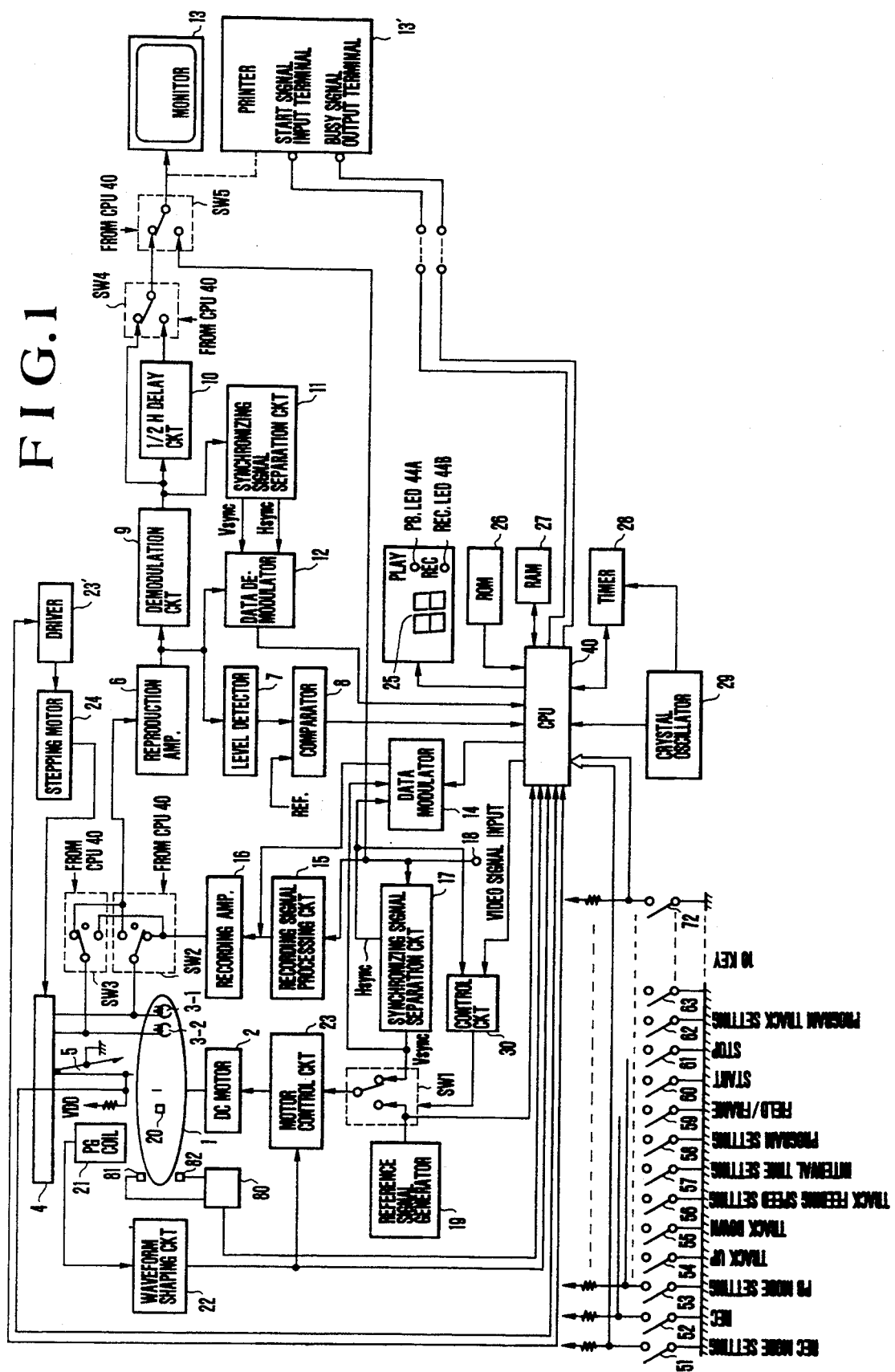
FIG. 1 is a block diagram showing the arrangement of an embodiment of this invention.

FIG. 1 shows the arrangement of the embodiment in a block diagram. The magnetic sheet 1 has the positions of video signal recording or reproducing tracks and the track pitch predetermined thereon. These tracks are concentrically formed. In the case of a frame video signal which has one field portion of the video signal recorded in one track, one-field video signals recorded in two adjacent tracks jointly form one frame video signal. A DC motor 2 is arranged to cause the magnetic sheet 1 to rotate at a constant speed. In-line type heads 3-1 and 3-2 are arranged to have access to two adjacent tracks. The head 3-1 is having access to the track on the outer circumferential side of the magnetic sheet 1 and the head 3-2 to the other track on the inner circumferential side. A magnetic head shifting device 4 is arranged to shift the positions of the magnetic heads 3-1 and 3-2 to bring them to the tracks formed on the magnetic sheet 1. An innermost track detection switch 5 shifts from an OFF state to an ON state when the magnetic head 3-2 has access to the innermost track on the magnetic sheet 1 and then produces a low level signal which is supplied to a microcomputer (hereinafter referred to as CPU) 40. A reproduction amplifier 6 is arranged to amplify signals detected by the magnetic heads 3-1 and 3-2. A level detector 7 is arranged to detect a mean level value of the output signal of the reproduction amplifier 6. A comparator 8 is arranged to detect whether the output of the level detector 7 is higher than a threshold value set at a reference voltage source which is not shown. A demodulation circuit 9 is arranged to demodulate the output signal of the reproduction amplifier 6. A ½ H delay circuit 10 is arranged to delay the output of the demodulation circuit 9 as much as ½ horizontal scanning period (hereinafter referred to as ½ H). A synchronizing signal separation circuit 11 is arranged to separate synchronizing signals such as a horizontal synchronizing signal Hsync and a vertical synchronizing signal Vsync, etc., from the output of the demodulation circuit 9. A data demodulator 12 is arranged to detect a predetermined data signal from the output of the reproduction amplifier 6 and to demodulate the data signal according to the timing of the synchronizing signal separated by the separation circuit 11. The data signal is of a lower frequency zone than the video signal and is recorded in a position in a predetermined positional relation to a part where the the synchronizing signal is recorded within the same track. The demodulation circuit 9 and the data demodulator 12 are separately arranged for the following reason: The video signal recorded on the magnetic sheet 1 is frequency modulated. Whereas, for the data signals other than the video signal, a DPSK (differential phase shift keying) modulation method which differs from the frequency modulation is employed. While the demodulation circuit 9 is arranged to frequency demodulate, the data demodulator 12 is arranged to DPSK demodulate.

A monitor 13 is arranged to permit observation of a reproduced video signal. A printer 13' is connected to the apparatus for the purpose of printing the video signal. The printer 13' is arranged to begin to operate when the level of a signal coming to a start signal input terminal becomes high and to make the level of a busy signal output terminal low while it is in operation. A modulator 14 is arranged, contrary to the data demodulator 12, to DPSK modulate data produced from the CPU 40 and to supply a recording amplifier 16 with data which is modulated at timing according to the synchronizing signals Hsync and Vsync separated by a synchronizing signal separation circuit 17 from the video signal coming to a video signal input terminal 18.

A recording signal processing circuit 15 is arranged to perform frequency modulation and other processes necessary for recording on the video signal coming via the input terminal 18 and to supply its output to the recording amplifier 16. A reference signal generator 19 is arranged to generate accurate reference pulses (60 Hz) required for rotating the magnetic sheet 1. A magnetized piece 20 is provided on the magnetic sheet 1. As will be further described later, the magnetized piece 20 produces a signal which is used in performing rotation control over a DC motor 2 in synchronism with the reference signal produced from the reference signal generator 19. A PG coil 21 is arranged for detecting the signal from the magnetized piece 20 when the magnetic sheet 1 is rotated by the DC motor 2.

A wave form shaping circuit 22 is arranged to shape the wave form of a signal produced from the PG coil 21. The output of the wave form shaping circuit 22 is supplied to the CPU 40 and a motor control circuit 23.

The motor control circuit 23 is arranged to control the rotation of the DC motor 2. The rotation of the DC motor 2 is controlled in such a manner that the synchronizing signal Vsync from the synchronizing signal separation circuit 17 or the signal produced from the reference signal generator 19 and the signal produced from the magnetized piece provided on the magnetic sheet 1 are always in a predetermined phasic relation to each other. For example, the rotation of the motor is controlled to keep the phases of the two deviating by 7 H from each other. When the magnetic heads 3-1 and 3-2 are performing a recording action, a switch SW1 is shifted beforehand to its connecting position on the side of the synchronizing signal separation circuit 17. Then, the rotation of the DC motor 2 is controlled on the basis of the signal coming from the magnetized piece 20 provided on the magnetic sheet 1. In case of reproduction by the magnetic heads 3-1 and 3-2, the connecting position of the switch SW1 is shifted beforehand for the reference signal generator 19. In this instance, the rotation of the DC motor 2 is controlled on the basis of the reference signal from the generator 19 and the signal produced from the magnetized piece 20 and coming via the wave form shaping circuit 22.

A driver 23' is arranged to drive a stepping motor 24 according to a signal produced from the CPU 40 for the purpose of controlling the position of the heads 3-1 and 3-2. The stepping motor 24 is thus arranged to shift the position of the heads 3-1 and 3-2 via the above-stated head shifting device 4. A display circuit 25 is arranged to be driven by a signal from the CPU 40. The display circuit is composed of display elements including, as shown in FIG. 3, seven-segment display elements which are arranged to display a number assigned to the track to which the head 3-1 has access in a two-place number and a speed at which the head is being shifted; a PB (play back) LED arranged to display a reproduction mode; and a REC (recording) LED arranged to display a recording mode. A ROM 26 stores the program of the CPU 40. A RAM 27 is arranged to temporarily store the data of the CPU 40. A timer 28 is arranged to be driven by the CPU 40. A crystal oscillator 29 is arranged to generate reference clock pulses for the CPU 40. A detecting circuit 80 is connected to photocouplers 81 and 82 which form a detection switch for detecting whether the magnetic sheet 1 is inserted in the apparatus. A switch SW1 is arranged to have its connecting position shifted by a signal from a control circuit 30 which is driven by a signal from the CPU 40. The switch SW1 connects the synchronizing signal separation circuit 17 to the motor control circuit 23 when a recording mode indicating signal is received from the CPU 40 while the synchronizing signal Hsync is produced from the synchronizing signal separation circuit 17. The switch SW1 connects the reference signal generator 19 to the motor control circuit 23 when a reproducing mode indicating signal is received from the CPU 40 while the signal Hsync is not produced from the synchronizing signal separation circuit 17. A switch SW2 shifts its connecting position on the basis of a signal from the CPU 40. The switch SW2 has a position in which the head 3-1 is connected to the recording amplifier 16; a position connecting the head 3-1 to the reproduction amplifier 6; and an intermediate position connecting the head neither to the recording amplifier 16 nor to the reproduction amplifier 6. A switch SW3 operates on the basis of a signal from the CPU 40 to shift its position among a position connecting the head 3-2 to the recording amplifier 16, another position connecting the same head to the reproduction amplifier 6 and an intermediate position connecting the same head neither to the recording amplifier 16 nor to the reproduction amplifier 6. A switch SW4 is also operated by the CPU 40 to shift its position as follows: In reproducing a frame video signal from the magnetic sheet 1 using both the heads 3-1 and 3-2, the position of the switch is shifted upward as viewed on FIG. 1 thus connecting them to the demodulation circuit 9. In reproducing a field video signal using only the head 3-1, the switch SW4 shifts between the upward shifted position and a downward shifted position. In other words, in that instance, the switch connects the head alternately to the demodulation circuit 9 and the ½ H delay circuit 10 for every field. A switch SW5 is driven by the CPU 40 to connect the monitor 13 to the video signal input terminal 18 for recording and to the switch SW4 for reproduction.

As mentioned in the foregoing, the video signal recorded or reproduced on and from the magnetic sheet 1 is sometimes a field video signal consisting of only one field or sometimes a frame video signal consisting of a pair of fields. The change-over of the connecting positions of the switches SW2, SW3, SW4 and SW5 for the field video signal and the frame video signal is as described below with reference to FIG. 2, which shows in combination the change-over states of the switches SW2, SW3, SW4 and SW5:

In the field reproduction, the switch SW2 connects the head 3-1 to the reproduction amplifier 6. The switch SW3 is in the intermediate position thus connecting the head 3-2 neither to the reproduction amplifier 6 nor to the recording amplifier 16. The switch SW4 allows a signal supplied from the demodulation circuit 9 to be supplied directly to the monitor 13 in the case of an odd number field and to be supplied via the ½ H delay circuit 10 to the monitor 13 if the field is an even number field. The position of the switch SW4 thus changes from one position over to the other every time the field changes. This prevents occurrence of a skew distortion.

In frame reproduction, the switch SW2 connects the head 3-1 to the reproduction amplifier 6 for an odd number field and shifts to the intermediate position thereof for an even number field. The switch SW3 is in the intermediate position thereof for an odd number field and connects the head 3-2 to the reproduction amplifier 6 for an even number field. Therefore, in the case of frame reproduction, the signal of either the head 3-1 or the head 3-2 is alternately supplied to the reproduction amplifier 6 for every field. In this instance, the position of the switch SW4 is shifted upward to allow the signal of the demodulation circuit 9 to be supplied directly to the monitor 13.

In either case of field reproduction or frame reproduction, the switch SW5 is driven to connect the monitor 13 to the switch SW4.

In field recording, the switch SW2 connects the head 3-1 to the recording amplifier 16 and the switch SW3 shifts to its intermediate position. Therefore, recording is performed by the head 3-1 in that instance.

Further, in frame recording, the switch SW2 connects the head 3-1 to the recording amplifier 16 for an odd number field and takes its intermediate position for an even number field. The switch SW3 takes its intermediate position for an odd number field and connects the head 3-2 to the recording amplifier for an even number field. The combination of the positions of these switches for the heads 3-1 and 3-2 may be reversed for frame recording.

In either case of field or frame recording, the switch SW5 shifts its position to connect the monitor 13 to the video signal input terminal 18 to enable the operator to observe the video signal to be recorded. Meanwhile, in any of these cases, the switch SW4 can be in any position thereof.

Figure 4:
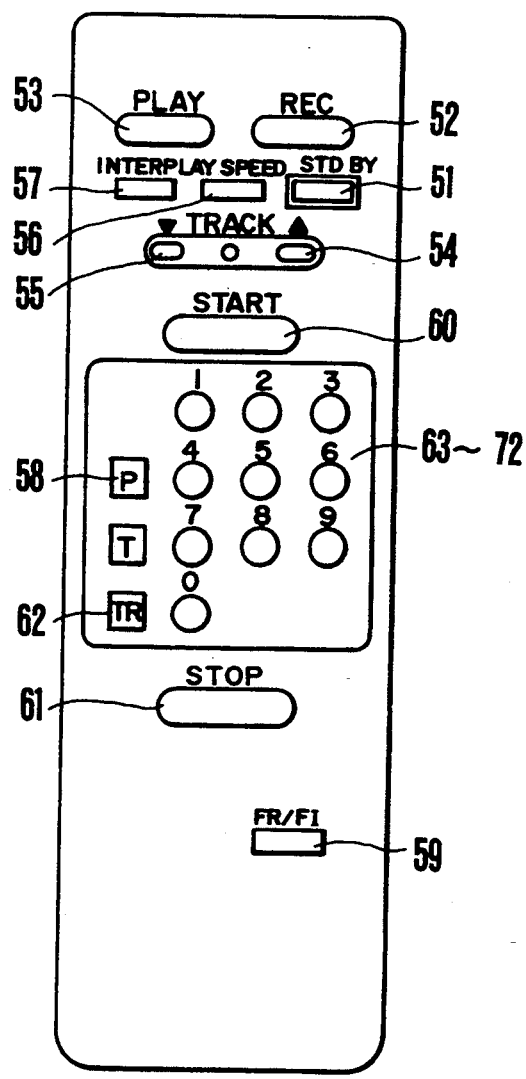
FIG. 4 is a front view of a remote control device to be used in combination with the same embodiment apparatus.

Next, the switches 51 to 63 and 72 shown in FIG. 1 are arranged as described in the following with reference to FIGS. 3 and 4 which are showing the appearance of this embodiment: FIG. 3 is a front view of the apparatus and FIG. 4 a front view of a remote control device. The switches 51 to 63 and 72 shown in FIG. 1 are divided into groups including a group of switches shown in FIG. 3, a group provided on the remote control device of FIG. 4 and a group disposed in both the apparatus of FIG. 3 and the remote control device of FIG. 4. In FIGS. 1 to 4, the switches performing the same functions are indicated by the same reference numerals. Among the switches shown in FIG. 3, those disposed only on the remote control device of FIG. 4 are shown in the circuit arrangement of FIG. 1 as connected through lines to the CPU 40 for the sake of illustration. In actuality, however, each of signals generated by operating the switches disposed on the remote control device is converted into infrared rays by the remote control device and is supplied to the CPU 40 via a remote control light receiving part 45 which is provided on the apparatus shown in FIG. 3.

The switches 51 to 63 and 72 may be arranged in various manner and their arrangement is not limited to the arrangement of this embodiment.

Referring to FIGS. 1 to 4, these illustrations include a power supply switch 41; a slot 42 for inserting the magnetic sheet; an ejection button 43 which is arranged to automatically eject the magnetic sheet 1 when it is turned on with the magnetic sheet in the inserted state; the above stated PB LED and REC LED 44A and 44B;

the remote control light receiving part 45 which is arranged to receive the signal of the remote control device shown in FIG. 4; an interval mode display LED 46 which lights up when an interval reproduction mode is selected; a display LED 48 which is arranged to show selection of field reproduction or recording or selection of frame reproduction or recording; the above stated two-place seven-segment LED 25; and LEDs 50A, 50B and 50C arranged to display the operated states of a programed reproduction setting switch 58, an interval time setting switch 57 and a programed track setting switch 62 respectively.

A REC mode setting switch 51 is arranged to set a recording mode and to determine whether the head is having access to a recorded track or non-recorded track. With this switch 51 turned on, when a track to which the head gained has access has some existing record, the REC LED makes a flickering display to show an unrecordable state of the track. The head mentioned here is the head 3-1 in the case of field recording and is at least one of the heads 3-1 and 3-2 in the case of frame recording. If the track has no existing record, the REC LED lights up to show the recordable state of the track in question.

A REC switch 52 is arranged to determine timing for recording operation. With a recording mode selected by means of the REC mode setting switch 51, the recording operation is performed on the magnetic sheet 1 when this switch 52 is turned on. In case that a continuous recording mode has been selected by means of a track feed speed setting switch 56, a continuous recording operation is performed with the use of the heads 3-1 and 3-2 being automatically changed from one head over to the other as long as this switch 52 remains in an ON state. A PB (play back) mode setting switch 53 is arranged to set the apparatus in a reproduction mode. When the switch 53 turns on, the PB LED lights up to show the selection of the reproduction mode. A track UP switch 54 is arranged to cause the driver 23' to rotate the stepping motor 24 when the switch 54 is operated. Then, the rotation of the stepping motor 24 causes the head shifting device 4 to shift the heads 3-1 and 3-2 from one track to another track located on the inner side of the magnetic sheet. Further, in case that frame recording has been selected by means of a field/frame setting switch 59, the heads 3-1 and 3-2 are shifted to an extent corresponding to two tracks respectively every time the track UP switch 54 is turned on. In that event, the seven-segment LED 25 displays a two-track shifted track number instead of a one-track shifted track number. In the event of selection of field recording or field reproduction, the heads 3-1 and 3-2 are shifted inward to an extent corresponding to one track when the track UP switch 54 is turned on. Then, the seven-segment LED 25 displays a one-track shifted track number. Further, when the heads 3-1 and 3-2 are shifted by the operation of the track UP switch 54 after selection of the recording mode, if the track to which the head 3-1 or 3-2 has access has existing records therein, the REC LED 44B makes a flickering display. A track DOWN switch 55 is arranged to shift the heads 3-1 and 3-2 in the direction of the outer circumference of the magnetic sheet (outward) instead of its inner circumference (inward).

The switch 55 is arranged in a manner similar to the track UP switch 54. When the switch 55 is operated with frame recording or frame reproduction selected, the seven-segment LED 25 displays a two-track-shifted track number instead of a one-track-shifted track number. In case that the switch 55 is operated with field recording or field reproduction selected, the heads are shifted by one track at a time and a one-track-shifted track number is displayed. Further, in the same manner as in the case of the track UP switch 54, when the heads 3-1 and 3-2 are shifted by the operation of the track DOWN switch 55 in the recording mode, the REC LED 44B makes a flickering display as necessary showing that the tracks to which the heads 3-1 and 3-2 gained access have existing records therein.

A track feed speed setting switch 56 is arranged to make a selection between a recording or reproducing operation to be performed with the positions of the heads automatically and continuously shifted and a recording or reproducing operation to be performed with the head shifted in a noncontinuous manner and is also arranged to set a track feeding speed to determine how often recording or reproduction is to be performed per second in the event of the continuous operation.

When the switch 56 is turned on from an OFF state by pushing it once, the seven-segment LED 25 comes to display a track feeding speed instead of a track number. If, under this condition, the track feed speed setting switch 56 is again turned on within a predetermined period of time counted by the timer 28, the seven-segment LED 25 cyclically makes displays every time the switch 56 is turned on including, for example, a display of "2" indicating continuous recording or reproduction of two picture planes per second; a display of "5" indicating continuous recording or reproduction of five picture planes per second; and a display of "10" indicating continuous recording or reproduction of 10 picture planes per second or makes a display of "1" indicating recording or reproduction of a single picture plane. Further, with the switch 56 turned on after it has been turned off to cause the seven-segment LED 25 to display a track feeding speed in place of a track number, if after that the switch 56 is not turned on again before expiration of the predetermined time counted by the timer 28, the display by the LED 25 comes back from the display of the track feeding speed to the normal track number display.

In case that the track feeding speed is changed by the switch 56 while the frame image recording mode has been already selected by the field/frame setting switch 59 and the REC mode setting switch 51, selection of continuous recording of ten picture planes per second becomes impossible.

An interval time setting switch 57 is provided for setting a relatively long interval time in a continuous reproducing operation and also for setting a track feeding interval time in the event of a programed reproduction mode set by means of a programed track setting switch 58 which will be described later. The interval time is set by means of the switches 63 to 72 of the ten-key switch arrangement before the lapse of 10 sec after the switch 57 is turned on. In the event that a switch other than the ten key switches 63 to 72 is turned on after the interval time setting switch 57 is turned on the interval time setting is automatically cancelled. A programed reproduction setting switch 58 is provided for setting the programed reproduction mode. This mode is set by programing beforehand a sequence in which tracks are to be reproduced and is continuously performed at intervals of a length of time set by means of the interval time setting switch 57.

In designating the sequence of reproducing tracks, the programed reproduction mode is first set by turning on the switch 58 on. Next, the track UP and track DOWN switches 54 and 55 are operated to shift the track access positions of them and to have the video signal of a desired track reproduced on the monitor 13 for confirmation. While performing this confirmation process, a programed track setting switch 62 is turned on to store the track number of each track confirmed by the monitor 13. The field/frame setting switch 59 is arranged such that change-over takes place from the field-recording or -reproduction mode to the frame-recording or -reproduction mode and vice versa every time this switch 59 turns on.

In the event that the continuous recording mode has been set for 10 picture planes per second by means of the REC mode setting switch 51 and the track feed speed setting switch 56, the track feeding speed is automatically changed to a continuous recording mode for five picture planes per second when frame recording is selected by the field/frame setting switch 59, because:

In the case of frame recording, unlike field recording, the heads 31 and 3-2 must be shifted to an extent corresponding to two tracks at a time. In the event of recording 10 picture planes per second, therefore, the heads must be shifted to a total extent corresponding to 20 tracks per second. However, it is difficult to carry out such a high speed head shift. In this particular embodiment of this invention, therefore, continuous frame recording for 10 picture planes per second is inhibited.

A start switch 60 is provided for continuous reproduction with intervals or programed reproduction. When the start switch 60 is turned on in the programed reproduction mode, reproduction is performed on the tracks one after another beginning with the first track at intervals set by the interval time setting switch 57 and the ten key switches 63 to 72 and programed reproduction begins with programed reproduction selected. A stop switch 61 is arranged to bring to a stop the reproducing operation initiated by the start switch 60. A reference numeral 62 denotes the above stated programed track setting switch.

The embodiment of this invention operates as described below with reference to flow charts shown in FIGS. 5 to 18:

When the power supply switch 41 shown in FIG. 3 is pushed in, the power supply to the apparatus shown in FIG. 1 turns on. Electric energy begins to be supplied to each of applicable circuit parts.

Step #1: With the power supply thus switched on, registers I and S, etc. which will be described later with reference to FIG. 15 are reset to "0". A PB (play-back) mode flag is set. Then, the track feeding speed is initially set for two picture planes per second and the interval time at three secondonds. In other words, the continuous reproduction mode is automatically set when the power supply is switched on. Step #2: A check is made to see if a jacket having the magnetic sheet 1 is inserted. If so, the flow of operation proceeds to a step #4 skipping the step #3. Step #3: With the jacket having the magnetic sheet 1 found to be inserted at the step #2, the DC motor 3 is driven. Step #4: A check is made to see if the head 3-1 has gained access to the 50th track by detecting whether the switch 5 shown in FIG. 1 is in an ON state. If the heads are found to have gained access to the 50th track, the flow of operation comes to a step #6. If not, the flow branches out to a step #5 to drive the stepping motor 24 shown in FIG. 1 to bring the head 3-1 to the 50th track by repeating the loop of steps #4 and #5. Step #6: With the head 3-1 having gained access to the 50th track, the flow of operation comes to this step to set a register N at a value of 50 for having access to a memory (RAM 27). Step #7: A check is made for the driving operation of the DC motor 2. With the above stated jacket inserted, the DC motor 2 has been caused to drive the magnetic sheet 1 by the step #3. In this event, the flow of operation proceeds to a step #8 to set a field flag.

If the jacket is not inserted, the DC motor 2 has not been operated as the step #3 has been skipped. In that event, therefore, the flow of operation comes back to the step #2 to see whether the jacket is inserted or not.

Step #8: The field flag is set if the DC motor 4 is found to be performing a driving operation at the step #7. Accordingly, the field mode indicating LED 44A which is shown in FIG. 3 lights up to show the field mode. In other words, In the case of this embodiment, the field mode is automatically selected with the power supply switched on and the jacket inserted. Step #9: The output of the level detector 7 shown in FIG. 1 is detected to find whether the track accessed by the head 3-1 is recorded or nonrecorded. The output level of the level detector 7 becomes high if the accessed track has already been recorded. In that event, the flow of operation proceeds to a step #10. If the output level of the level detector 7 is low, the flow of operation comes to a step #16. Let us here first described the step #16. Step #16: Data "0000" is set at an address N of the memory. The data "0000" indicates that the track corresponding to this particular address is nonrecorded (has no previous or exsisting record).

Figure 6:
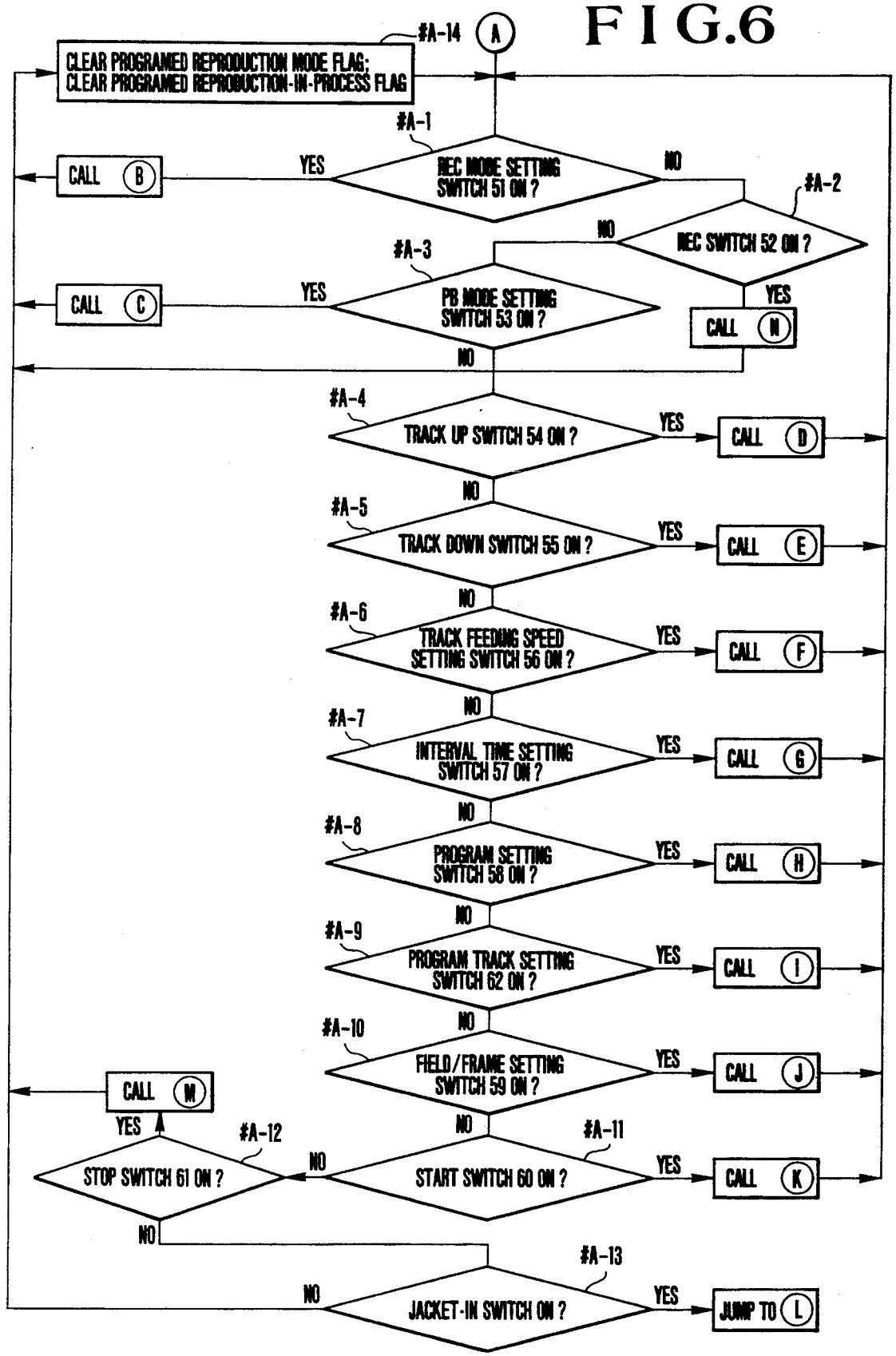

The flow of operation at a step #10 and subsequent steps is as follows:

Step #10: With the output of the level detector (or detecting circuit) 7 having been found to be at a high level at the step #9, a signal recorded in the track is reproduced. Then, an ID (identification) signal is taken in from the data demodulator 12. Step #11: The content of the ID signal is detected to discriminate the video signal recorded in the track between a field video signal and a frame video signal. If it is a field video signal, the flow of operation shifts to a step #15. If it is a frame video signal, the flow proceeds to a step #12. Step #12: The video signal recorded in the track accessed by the head 3-1 is checked to find whether the signal is recorded in the inner side track of the frame video signal or in the outer side track thereof. The flow of operation comes to a step #14 if the track is located on the inner side or proceeds to a step #13 if it is located on the outer side. Step #13: With the video signal of the track accessed by the head 3-1 found to be in the outer track of the frame video signal, the address N of the memory is set at "0011." In case that the flow of operation comes from the step #1 to this step for the first time, the address N has been set 50 at the step #6. Step #14: In the event of the inner track of the frame video signal, the address N of the memory is set at "0010." Step #17: The head 3-1 is shifted to a first track. Then, if a state of N=1 is detected, the flow of operation comes to a step #20. If not, the flow of operation proceeds to a step #18. With the state of N=1 not detected at the step #17, the head 3-1 is shifted outward to an extent corresponding to one track pitch. Step #19: With the head 3-1 shifted outward at the step #18, 1 is subtracted from the value N to renew it. Step #20: With the state of N=1 detected at the step #17 indicating that the head 3-1 has gained access to the first track which is located outermost on the magnetic sheet, when information on the presence or absence of any record there is set at the memory, the data of the address N, i.e. the first address, of the memory is read out. If the data is "0011" thus indicating that the first track is the outer side track of two tracks forming a frame video signal, the flow of operation proceeds to a step #21. If not, the flow of operation comes to a step #23. Step #21: With the first track having been found at the step #20 to be the outer track of the two tracks forming a frame video signal, the data of an address N+1, i.e. a secondond address of the memory is read out. If the data is "0010" thus indicating that a secondond track is the inner track of the two tracks forming the frame video signal, the flow of operation proceeds to a step #22. Step #22: With the frame video signal having been found to be recorded in the first and secondond tracks, the field flag which is set at the step #8 is cleared to change the field mode over to a frame mode. The field/frame display LED 48 which is shown in FIG. 3 lights up to show the frame mode. Steps #23 and #24: The register N showing the above stated memory address is displayed by the two-place seven segment LED 25 shown in FIGS. 1 and 3. This display enables the operator to know the track number to which the head 3-1 has gained access. Upon completion of this step, the flow of operation jumps to another flow (A), which is as shown in FIG. 6. Referring to the flow chart of FIG. 6:

Step #A-1: A check is made to see if the REC mode setting switch 51 is in an ON state. If so, the flow of operation calls a subroutine (B) to set the recording mode. If not, the flow proceeds to a step #A-2. Step #A-2: A check is made to see if the REC switch 52 has been turned on. If so, a subroutine (N) is called. If not, the flow proceeds to a step #A-3. Step #A-3: A check is made to find if the PB mode setting switch 53 has been turned on. If so, a subroutine (C) is called. If not, the flow proceeds to a step #A-4. Step #A-4: If the track UP switch 54 is turned on, the flow of operation calls a subroutine (D). if the switch 54 is not turned on, the flow proceeds to a step #A-5. Step #A-5: If the track DOWN switch 55 is turned on, the flow of operation calls a subroutine (E). If not, it proceeds to a step #A-6. Step #A-6: If the track feed speed setting switch 56 is turned on, the flow of operation calls a subroutine (F). If not, it proceeds to a step #A-7. Step #A-7: If the interval time setting switch 57 has been turned on, the flow of operation calls a subroutine (G). If not, it proceeds to a step #A-8. Step #A-8: If the program setting switch 58 has been turned on, the flow of operation calls a subroutine (H). If not, it proceeds to a step #A-9. Step #A-9: If the program track setting switch 62 has been turned on, the flow of operation calls a subroutine (I). If not, it proceeds to a step #A-10. Step #A-10: If the field/frame setting switch 59 has been turned on, the flow of operation calls a subroutine (J). If not, it proceeds to a step #A-11. Step #A-11: If the start switch 60 has been turned on, the flow of operation calls a subroutine (K). If not it proceeds to a step #A-12. Step #A-12: If the stop switch 61 has been turned on, a subroutine (M) is called. If not, the flow of operation proceeds to a step #A-13. Step #A-13: If a jacket detection switch (corresponding to the detection circuit 80 of FIG. 1) has been turned on, the flow of operation jumps to a subroutine (L). If not, it proceeds to a step #A-14.

Step #A-14: A programed reproduction mode flag and a programed reproduction in-process flag are cleared.

Figure 5:
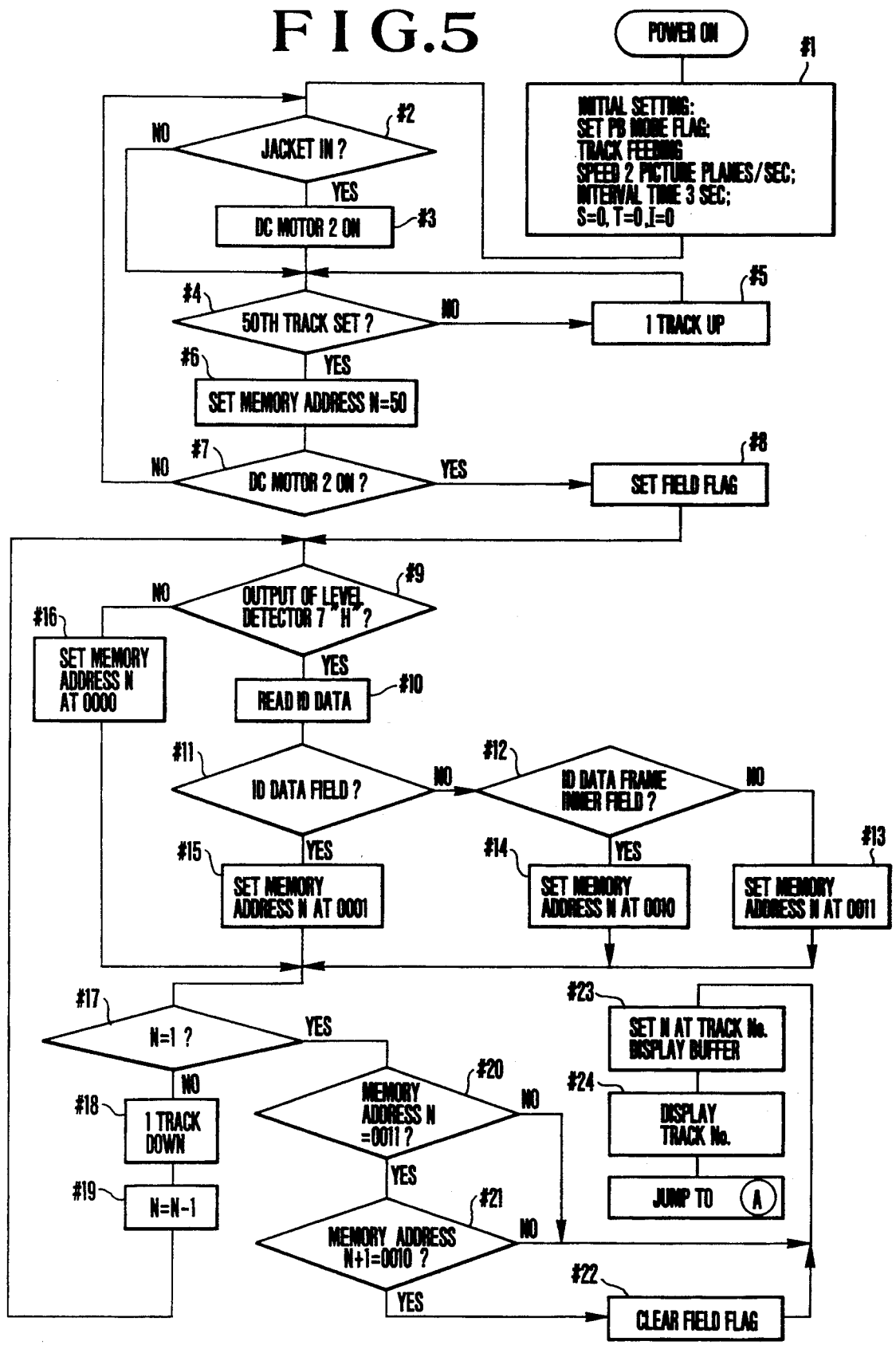
Figure 7:
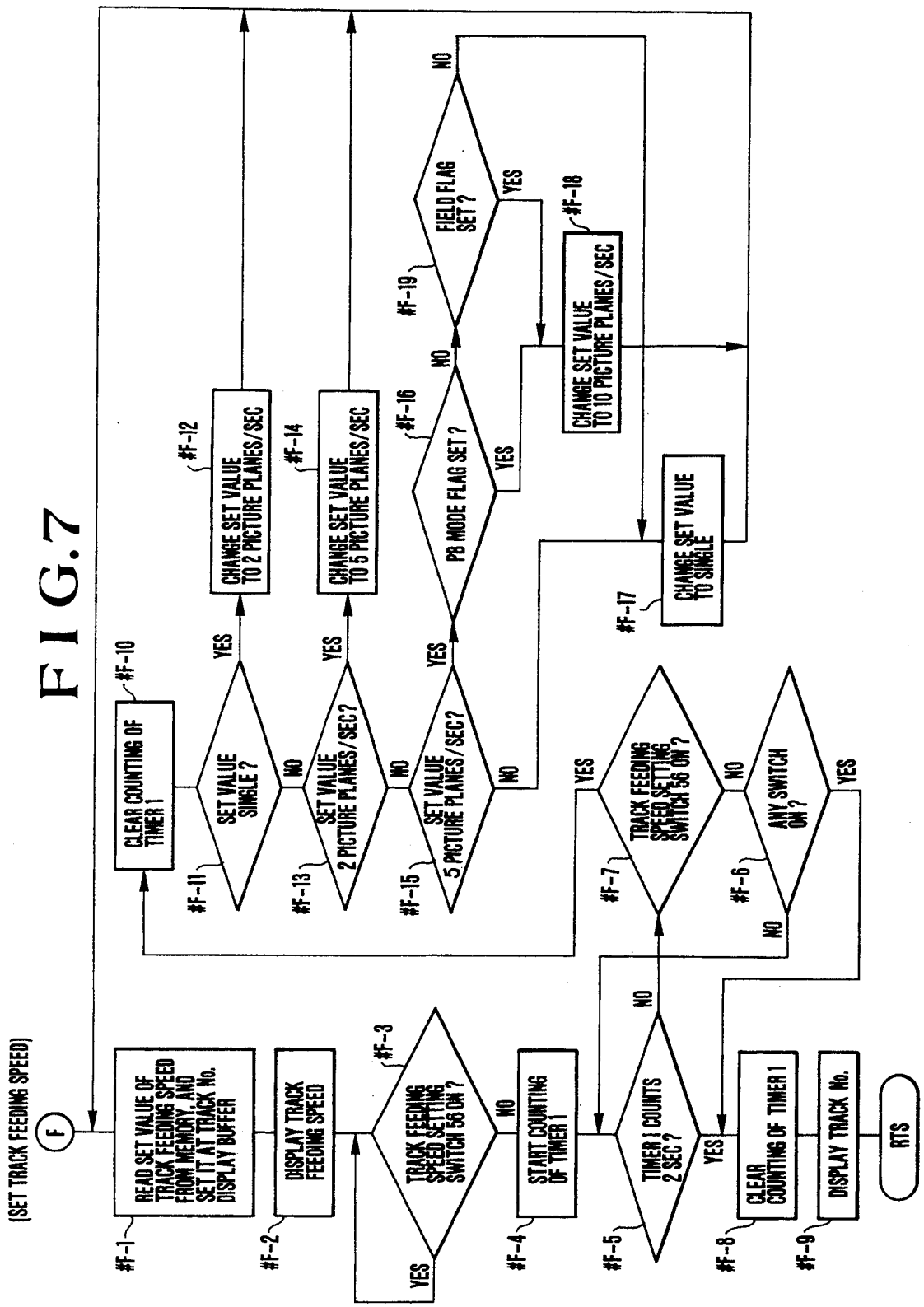

After the head 3-1 is allowed to gain access to the first track on the magnetic sheet with the flow of operation carried out as shown in FIG. 5, the operation jumps to the flow (A) shown in FIG. 6. The flow (A) of operation is repeatedly performed while checking the switches shown in FIGS. 1, 3 and 4 for their states until the state of each of these switches comes to change over to the other state. A subroutine corresponding to each of these operated switches is called. The subroutine (F) which is called when the track feed speed setting switch 56 is turned on is as described below with reference to FIG. 7:

FIG. 7 is a flow chart showing the subroutine (F) to be carried out when the switch 56 which is provided for changing a track feeding speed. Steps #F-1 and #F-2: A setting value of track feeding speed is read out from the memory. The setting value thus read out is set at a track number displaying buffer which is not shown. Therefore, a track feeding speed is displayed at the two-place, seven-segment. LED 25 shown in FIG. 3. When the flow of operation comes to the step #F-1, a track feeding speed has been set at a value for two picture planes per second and the LED 25 displays "2" accordingly. Step #F-3: If the track feeding speed setting switch 56 is in an ON state, the flow of operation respectively performs the step #F-3. If not, the flow of operation comes to a step #F-4.

As mentioned in the foregoing, the two-place, seven-segment LED 25 is arranged to change its track number display over to a track feeding speed display when the track feed speed setting switch 56 turns on for once. After that, when the switch 56 again turns on, the track feeding speed is changed over to another value. The step #F-3 is arranged to have the track feeding speed changed when the switch 56 comes again to turn on after it is turned off from the initial turned-on state as mentioned above.

Steps #F-4 to #F-7: With the display by the two-place, seven-segment LED 25 of FIG. 3 changed from the track number display over to the track feed speed display by turning on the track feed speed setting switch 56, if the switch 56 or any other switch is not turned on before the lapse of a predetermined period of time (two secondonds) after the change-over, the track feeding speed setting action is cancelled through these steps #F-4 to #F-7. When the track feed speed setting switch 56 is turned on before the lapse of the predetermined period of time (two secondonds) after the start of time count by the timer 1, the flow of operation comes from the step #F-7 to a step #F-10. If the switch is turned on after completion of the time count by the timer 1 or when another switch is turned on, the flow of operation proceeds from the step #F-6 to a step #F-8. Step #F-8: The count value of the timer 1 is cleared. Step #F-9: Contrary to the step #F-1, the display by the two-place, seven-segment LED 25 is brought back to the track number display. Step #F-10: The count value of the timer 1 is cleared. Step #F-11: A check is made to find if the set value of the track feeding speed is for a single performance, which means that the head is shifted after one performance of recording or reproduction to an extent corresponding to one track in the field mode or to an extent corresponding to two tracks and then the recording or reproduction comes to a stop in the frame mode. The flow of operation proceeds to a step #F-12 in the case of a single performance or comes to a step #F-13 if the set value is not for a single performance. Further, after the power supply switch 41 is turned on, the track feeding speed has been set for two picture planes per second at the step #1 before the flow of operation comes to this step. Step #F-12: In the event of the track feed speed setting value for a single performance, the set value is changed to a value for two picture planes per second and then the flow of operation comes back to the step #F-1. Then, the renewed track feed speed is displayed and the above stated steps #F-3 to #F-7 are performed. Step #F-13: A check is made to find if the track feed speed setting value is for two picture planes per second. If so, the flow of operation proceeds to a step #F-14. If not, the flow comes to a step #F-15. Step #F-14: The track feed speed setting value is changed to a value for five picture planes per second. The flow of operation then comes back to the step #F-1. The renewed track feed speed value is displayed and the steps #F-3 to #F-7 are carried out.

Step #F-15: A check is made to find if the track feed speed setting value is for five picture planes per second. If so, the flow of operation proceeds to a step #F-16. If the set value is found not for five picture planes per second but for ten picture planes per second, the flow of operation comes to a step #F-17. Step #F-16: A check is made to find if the PB mode flag is set indicating that the reproduction mode has already been set. If so, the flow of operation comes to a step #F-18. If not, if comes to a step #F-19. Step #F-17: The track feed speed setting value is changed to a value for a single performance and the flow of operation comes back to the step #F-1. A new track feed speed value thus set is displayed and the steps #F-3 to #F-7 are carried out. Step #F-18: In a continuous reproduction mode, field reproduction is performed irrespective as to whether the video signal recorded in the tracks of the magnetic sheet 1 is a field video signal or a frame video signal. In this instance, the track feed speed setting value is changed to a value for ten picture planes per second and then the flow of operation comes back to the step #F-1. Step #F-19: A check is made to see if the field flag is set thus indicating the field recording mode with the track feed speed set for ten picture planes per second. If so, the flow of operation branches out to a step #F-18. If not, the flow comes to the step #F-17 to change the track feed speed setting value to a value for a single performance.

In the subroutine (F) described above, the two-place, seven-segment LED 25 displays the track feed speed when the track feed speed setting switch 56 is turned on. Then, after that, the track feeding speed can be changed by again turning the switch 56 on within a predetermined period of time (two secondonds). The range of selectable track feeding speeds includes the following three speeds in the frame recording mode: A speed for a single performance, a speed for two picture plane per second and a speed for five picture plane per second. In a mode other than the frame recording mode, the selectable track feeding speed range includes the following four speeds: A speed for a single performance, a speed for two picture planes per second, a speed for five picture planes per second and a speed for ten picture planes per second. The selectable speed range depends on the track shifting capability of the arrangement including the device for shifting the heads 3-1 and 3-2, etc. shown in FIG. 1. Therefore, the range of selectable track feeding speed is set at a suitable range according to the track shifting capability.

Figure 8:
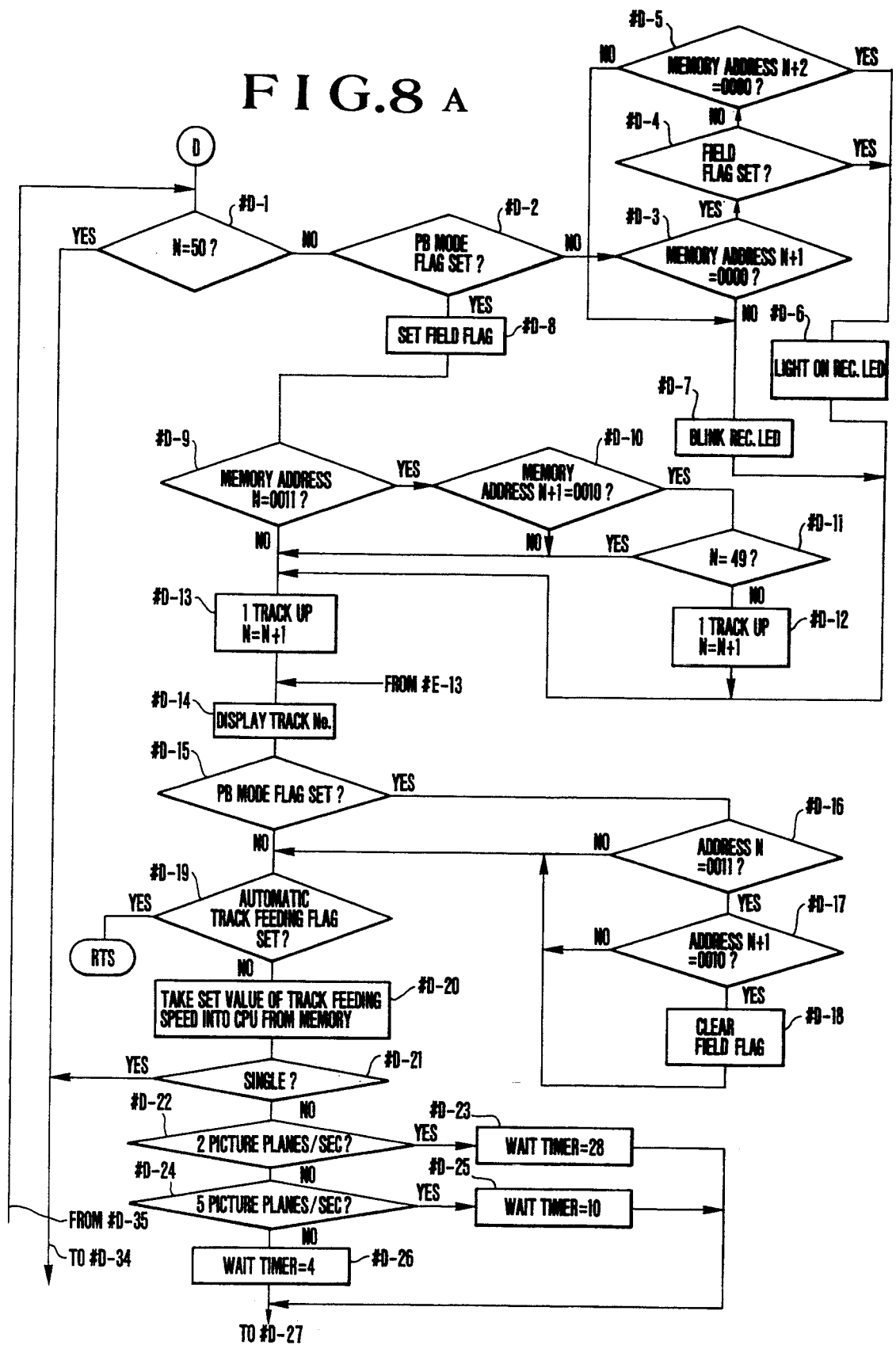
Figure 8B:
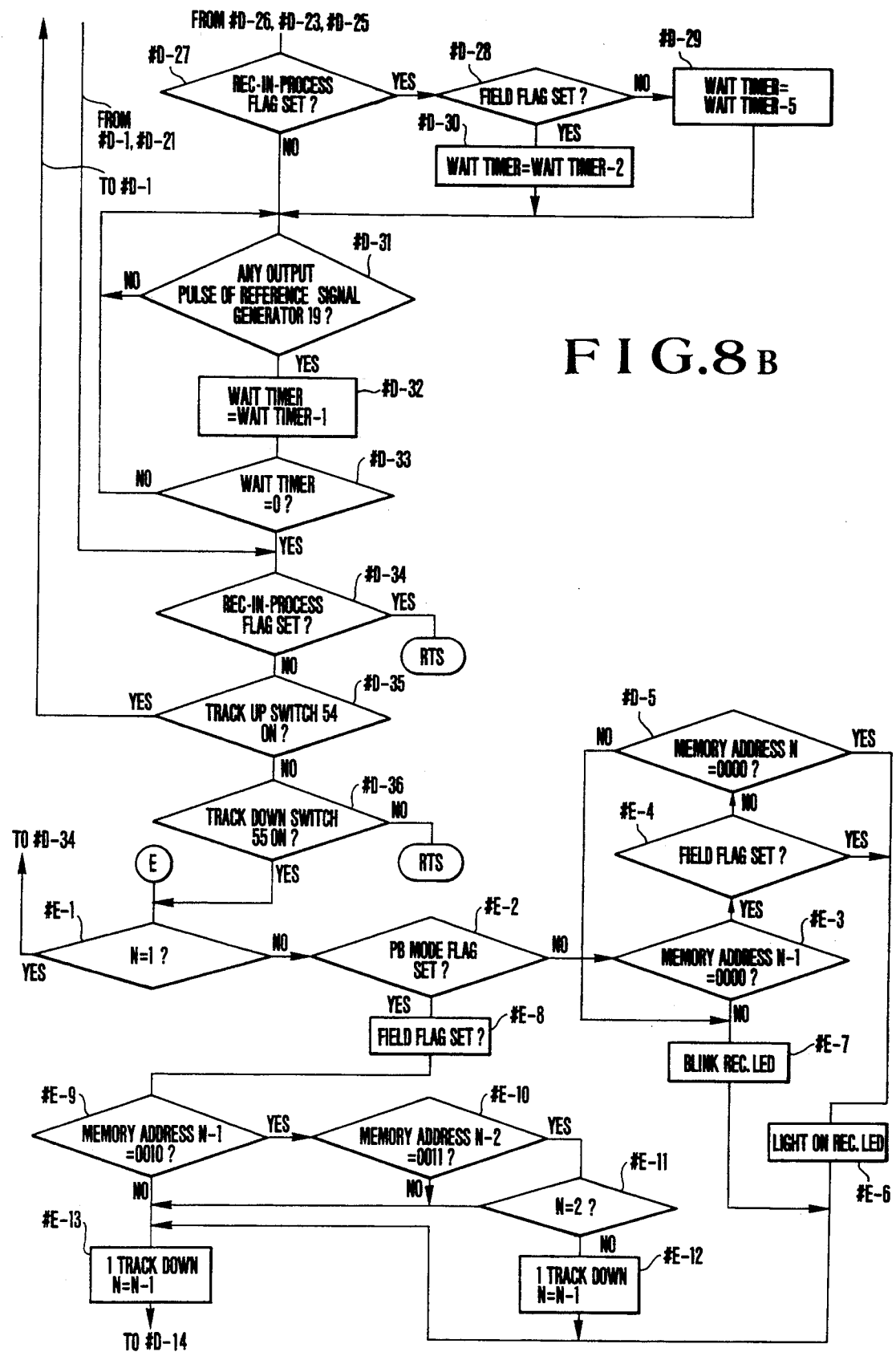

Referring now to FIGS. 8A and 8B, the subroutines (D) and (E) which are to be called out when the track UP switch 54 or the track DOWN switch 55 is turned on during the process of the subroutine (A) shown in FIG. 6 are as follows:

The flow of operation to be performed when the track UP switch 54 is turned on is first described. Step #D-1: When the flow of operation comes to this step, the register N is checked to see if it is at a value 50 for the purpose of finding whether the track to which the head 3-1 has gained access is the innermost track of the magnetic sheet. If the register N is found not at 50, the flow of operation proceeds to a step #D-2. If it is found to be at 50, the flow comes to a step #D-34. Step #D-2: A check is made to find if the PB mode flag has been set thus indicating the reproduction mode. If so, the flow of operation comes to a step #D-8. If not, the flow proceeds to a step #D-3. Step #D-3: A check is made to see if the address N+1 of the memory is at "0000" thus indicating that a No. N+1 track contains no record. If so, the flow of operation proceeds to a step #D-4. If not, the flow branches out to a step #D-7. Step #D-4: With the No. N+1 track having been found to be not recorded at the step #D-3, a check is made to see if the field flag is set. If so, the flow of operation comes to a step #D-6. If not, the flow proceeds to a step #D-5. Step #D-5: With the field flag found not set at the step #D-4 thus indicating the frame mode, a check is made to see if the content of the memory at an address N+2 is at "0000" thus indicating that the No. N+2 track of the magnetic sheet has no existing record (unrecorded). If so, the flow of operation proceeds to a step #D6. If not, it comes to a step #D-7.

With the steps #D-3 to #D-5 carried out, the flow of operation comes to the step #D-6 if two consecutive tracks are both unrecorded in the case of the frame mode. If one of the two tracks is recorded, the flow of operation comes to the step #D-7.

Step #D-6: The flow of operation comes to this step when a track accessed by the head 3-1 in the field mode or a track accessed by the head 3-1 and a track which is accessed by the head 3-2 and is located on the inner side of the former in the case of the frame mode are unrecorded and are recordable. In this case, the REC LED 44B shown in FIG. 3 lights up. Step #D-7: Contrarily to the step #D-6, if the tracks accessed by the heads 31 and 3-2 are recorded and unrecordable, the REC LED 44B shown in FIG. 3 is caused to blink (flicker) to inform the operator of the unrecordable state of the track. Step #D-8: With the PB mode flag found to have been set at the step #D-2, the field flag is set. This step #D-8 will be further described later along with further steps #D-9, #D-10 and #D-13. Step #D-9: A check is made to see if the address N of the memory is at "0011"0 indicating that a track being accessed by the head 3-1 is one of two tracks located on the outer side as mentioned in the description of the step #13. If so, the flow of operation proceeds to the step #D-10. If not, it comes to the step #D-13. Step #D10: A check is made to see if the address N+i of the memory is at "0010" thus indicating that a track being accessed by the head 3-2 is one of two tracks located on the inner side. If so, the flow of operation proceeds to a step #D-11. If not, it comes to the step #D-13.

In case that one of two frame video signal forming tracks which is located on the inner side is either erased or has a video signal newly recorded after erasing, even if a track accessed by the head 3-1 is located on the outer side of the two tracks forming the frame video signal, another track accessed by the other head 302 might not be one of the two tracks which is located on the inner side. In that event therefore, in shifting the heads 3-1 and 3-2 inward, these heads must be shifted only to an extent of one track instead of two for erasing or for reproducing the video signal newly recorded after erasing. However, under the condition of having the heads 3-1 and 3-2 shifted inward to the extent of only one track, the tracks being accessed by these heads do not always have a frame video signal recorded therein. These tracks might have different field video signals recorded therein. In the latter case, if the field flag is in a reset state, the two different field video signals would be reproduced as a frame video signal. This embodiment solves that problem by the provision of the step #D-8 mentioned in the foregoing. In other words, the field flag is set to obtain the field mode before these heads are shifted inward as mentioned above. Therefore, the possibility of having completely different field video signals reproduced as a frame video signal can be eliminated.

Step #D-11: A check is made to see if the register N is at 49. If so, the flow of operation comes to a step #D-13. If not, it comes to a step #D-12. Step #D-12: With a frame video signal recorded in two adjacent tracks accessed by the heads 3-1 and 3-2, the flow of operation comes to this step. Under this condition, if the track UP switch is turned on, the driver 23 is operated to have the heads 3-1 and 3-2 shifted to the extent of just one track at this step. Following that, at the step #D-13, the heads 3-1 and 3-2 are further shifted to the extent of one track. Meanwhile the content of the register N is renewed and changed by one every time the heads are thus shifted. Step #D-13: The heads 3-1 and 3-2 are shifted to the extent of one track in the same manner as in the preceding step #D-12. Step #D-14: The two place, seven-segment LED 25 shown in FIG. 3 is caused to display the content of the register N in the same manner as in the step #23.

Since the step #D-14 is subsequent to the steps #D-12 and #D13 in this embodiment, the track number displayed by the LED is changed by two at a time when a frame video signal is recorded in the tracks to which the heads 3-1 and 3-2 gain access. In case that a field video signal is recorded, the track number display of the LED 25 is changed by one at a time. Therefore, the display shows which of the field and frame video signals is recorded on the magnetic sheet 1.

Further, if this step is provided also in between the steps #D-12 and #D-13, the track number display of the LED 25 is renewed and changed by one at a time even in cases where a frame video signal is recorded in two adjacent tracks accessed by the heads 3-1 and 3-2.

Step #D-15: A check is made to see if the PB mode flag is set. If so, the flow of operation comes to a step #D-16. If not, it comes to a step #D-19. Step #D-16: A check is made to see if the address N of the memory is at "0011" thus indicating that the track accessed by the head 3-1 is the outer side track of two tracks having a frame video signal recorded. The content of the address N corresponds to the number assigned to the track to which the head 3-1 has gained access as repeatedly mentioned in the foregoing. If the content of the address N is found to be "0011", the flow of operation proceeds to a step #D-17. If not, the flow branches out to a step #D-19. Step #D-17: A check is made to find if the content of the address N+i of the memory is "0010" thus indicating that the head 3-1 has gained access to the inner side track of two adjacent tracks in which a frame video signal is recorded. If so, the flow of operation proceeds to a step #D-18. If not, it branches out to the step #D-19.

Step #D-18: When the flow of operation comes to this step through the steps #D-16 and #D-17, a frame video signal is recorded in two adjacent tracks to which the heads 3-1 and 3-2 has gained access after a shift of their positions. Therefore, the field flag which has been set at the step #D-8 is cleared to obtain a frame reproducing mode. Step #D-19: A check is made to see if an automatic track feed flag is set. If so, the flow of operation proceeds to a step #D-20. If not, the flow comes back from this subroutine (RTS). The automatic track feed flag is arranged to be set in another subroutine (K). This flag is arranged to enable the flow of operation to pull out from the subroutine (D) or from another subroutine (E) when the subroutine (D) or (K) is called during execution of a program for repeating a reproducing action while automatically feeding the tracks.

Step #D-20: A track feed speed setting value is taken in from the memory. Step #D-21: A check is made to see if the track feed speed setting value is for a single performance. If so, the flow of operation comes to a step #D-34. If not, it proceeds to a step #D-22. Step #D-22: A check is made to see if the track feed speed setting value is for two picture planes per second. If so, the flow of operation proceeds to a step #D-23. If not, it comes to a step #D-24. Step #D-23: A wait timer register which is disposed within the CPU 40 is set at 28. Step #D-24: A check is made to see if the track feed speed setting value is for five picture planes per second. If so, the flow of operation proceeds to a step #D-25. If not, it comes to a step #D-26. Step #D-25: The wait timer register is set at 10. Step #D-26: In case that the track feed speed setting value is for ten picture planes per second, the flow of operation comes to this step. The wait timer register is set at 4. Further, the wait timer register the value of which is set at the above stated steps #D-23, #D-25 and #D-26 is arranged to control the track feeding speed. The content of the timer register is arranged to be decreased every time the magnetic sheet 1 is caused to make one turn by the DC motor 2 at steps #D-31 and #D-32 which will be described later. Step #D-27: A check is made to see if the REC-in-process flag is set. If so, the flow of operation proceeds to a step #D-28. If not, it branches out to a step #D-31. The REC-in-process flag (or REC flag) is arranged to be set in a subroutine (N). When the subroutine (D) is called out while a program of repetitively performing a recording action by automatically feeding tracks is in process, this flag gives a period of time necessary for recording by setting a length of time at the wait timer register when the subroutine (D) is called and by subtracting 2 or 5 from the content of the register at a step #D-29 or #D-30. In other words, the REC flag is provided for the purpose of determining a timing for recording in a predetermined position on the magnetic sheet 1 a signal which is obtained by detecting the rotating state of the magnetic sheet 1 from the PG coil 21 and also for recording the signal on the magnetic sheet 1.

Steps #D-28, #D-29 and #D-30: The field flag is checked to find if it has been set. If so, 2 is subtracted from the content of the wait timer register. If not, 5 is subtracted from the content of the register. In this instance, the wait timer register is set at 4 if the track feeding speed is set for ten picture planes per second. However, such setting is possible only for the field mode. Therefore, in that event, the wait timer register never has 5 subtracted from its content.

Step #D-31: A check is made to see if pulses are produced from the reference signal generator 19 shown in FIG. 1. If so, the flow of operation proceeds to a step #D-32. If not, it repeats the step #D-31. Step #D-32: One is subtracted from the content of the wait timer register. Step #D-33: A check is made to see if the content of the wait timer register has become 0. If so, the flow of operation comes to a step #D-34. If not, it comes to the step #D-31.

At the steps #D-32 and #D-33, the wait timer register and the reference signal generator 19 are used as a timer for controlling the track feeding speed. Compared with a method of forming a timer by performing subtraction from the content of the wait timer register according to the output of the wave form shaping circuit 22 which is arranged to shape the wave form of the output of the PG coil 21, the method of the steps #D-32 and #D-33 permits a more stable and accurate time counting action, because: While the output of the PG coil 21 is likely to include some error resulting from unevenness of rotation of the magnetic sheet 1, the output of the reference signal generator 19 is substantially free from such error. Further, in the event of reproduction or recording with intervals, the DC motor 2 is preferably stopped from rotating during the interval time. In that event, the method of performing subtraction from the wait timer register according to the output of the wave form shaping circuit 22 is incapable of including the interval time. Whereas, in accordance with the method of this embodiment, the time counting action can be stably carried out even in that event.

Step #D-34: A check is made to see if the REC-in-process flag has been set. If so, the flow of operation comes back to the program (RTS) carried on before calling the subroutine (D). If not, it comes to a step #D-35. Step #D-35: A check is made for the ON state of the track UP switch 54. If the switch 54 is found to be on, the flow of operation comes to the step #D-1 to have the track access position of the heads 3-1 and 3-2 shifted inward. If not, the flow of operation comes to a step #D-36. Step #D-36: A check is made for the ON state of the track DOWN switch 55. If the switch 55 is on, the flow of operation shifts to a step #E-1 of the subroutine (E) for shifting outward the track access position of the heads 3-1 and 3-2. If not, the flow comes back to the program pursued before calling the subroutine (D).

The subroutine (E) which is to be carried out when the track DOWN switch 55 is turned on is as described in the following: In the subroutine (E), steps #E-1 to #E-13 are similar to the steps #D-1 to #D-13 and therefore the details of these steps are omitted here. In the subroutine (E), when the track DOWN switch 55 is turned on, the register N is checked for a state of N=1 at the step #E-1, for example, for shifting outward the track access position of the heads 3-1 and 3-2. At the step #E-9, a check is made to find if a memory address N-1 is at "0010" thus indicating the inner side track of two tracks forming a frame video signal. At the step #E-10, a check is made to find if a memory address N-2 is at "0011" indicating the outer side track of the two tracks forming the frame video signal. At the step #E-11, a check is made for a state of N=2. At the steps #E-12 and #E-13, the heads 3-1 and 3-2 are shifted outward to the extent of one track.

Referring to FIG. 9, the subroutines (J) and (B) which are to be called when the field/frame selection switch 59 and the REC mode setting switch 51 are turned on are as described below:

Step #J-1: When the field/frame selection switch 59 is found to be turned on at the step #A-10 shown in FIG. 6, the flow of operation comes to the step #J-1. At this step, if the field flag is set, the flow of operation proceeds to a step #J-2. If not, it branches out to a step #J4. Step #J-2: With the field flag found to be set at the step #J-1, the flag is cleared at the step #J-2. Step #J-3: A check is made to see if the PB mode flag is set. If so, the flow of operation comes to a step #J8. If not, it branches out to a step #J-5.

Step #J-4: With the field flag found not set at the step #J-1, the field flag is set at the step #J-4.

When the field flag is cleared at the step #J-2 in the recording mode with the PB mode not selected, there obtains a frame recording mode. Then, as mentioned in the description of the subroutines (D) and (E), track feeding at a speed for ten picture planes per second is impossible. Therefore, in the subroutine (J), if the track feed speed has been set for ten picture planes per second at the time of change-over from the field mode to the frame mode, the change-over must be inhibited. In view of that, this embodiment is arranged to have the track feed speed setting value automatically changed at steps #J-6 and #J-7 to a speed for five picture planes per second if it has been set at a speed for ten picture planes per second.

Step #J-5: Data of a track feed speed setting value is taken into the CPU 40. Step #J-6: If the track feed speed setting value taken in at the step #J-5 is for ten pictures per second, the flow of operation proceeds to a step #J-7. If not, it branches out to a step #J-8. Step #J-7: The track feed speed setting value is changed to a value for five picture planes per second. Step #J-8: This step is repeated as long as the field/frame selection switch 59 is kept in an ON state. When the switch turns off, the flow of operation comes back to the step #A-1 of FIG. 6.

The subroutine (B) which is called when the REC mode setting switch 51 is turned on is as described below:

Step #B-1: When the REC mode setting switch 51 is found to have turned on at the step #A-1 of FIG. 6, the flow of operation comes to this step #B1. Then, the light of the PB LED 44A is put out and the PB mode flag is cleared. Steps #B-2, -3, -4, -5 and -6: These five steps are similar to the steps #D-3 to #D-7 respectively and, therefore, omitted from description given here. Step #B-6': This step is repeated as long as the REC mode setting switch 51 is kept in an ON state. The flow of operation proceeds to a step #B-7 when the switch 51 is turned off. Step #B-7: With the REC mode setting switch 51 having been turned off, a check is made to find if the field flag is set. If so, the flow of operation comes back to the step #A-1 of FIG. 6. If not, it jumps to the step #J-5 of the subroutine (J). Then, if the track feed speed setting value is for ten picture planes per second, the set value is automatically changed to a speed for five picture planes per second by carrying out the steps #J-6 to #J-8. Therefore, in the event of a frame mode with the REC mode set by the REC mode setting switch 51, the track feed speed setting value is limited to a speed for five picture planes per second.

Referring to FIG. 10, the subroutine (C) which is to be called when the PB mode setting switch 53 is turned on is as described below:

Step #C-1: The flow of operation branches out to this step upon detection of that the PB mode setting switch 53 is turned on at the step #A-3 of FIG. 6. At the step #C-1, the field flag is temporarily set. In case that the frame recording mode has been set by resetting the field flag with the PB mode flag cleared while different field video signals are recorded in two tracks accessed by the heads 3-1 and 3-2, the different field video signals would be reproduced in an interlaced state if a reproducing action is immediately performed on the tracks accessed by the heads 3-1 and 3-2 when the PB mode setting switch 53 is found to have turned on. The step #C-1 is provided for preventing this inconvenience.

Step #C-2: A check is made to see if an applicable memory address is at "0011" thus indicating that the head 3-1 has gained access to a track which is one of two tracks having a frame video signal recorded therein and is located on the outer side of the other. If so, the flow of operation proceeds to a step #C-3. If not, it branches out to a step #C-5.

Step #C-3: A check is made to see if a memory address N+1 is at "0010" thus indicating that a track to which the head 3-2 has gained access is one of the two frame signal recorded tracks and is located on the inner side. If so, the flow of operation proceeds to a step #C-4. If not, it branches out to the step #C-5.

Step #C-4: The flow of operation comes to this step upon detection of that a frame video signal is recorded in two adjacent tracks to which the heads 3-1 and 3-2 have gained access. A field flag is cleared and the frame mode is set.

Step #C-5: The PB LED 44A shown in FIG. 3 lights up. The PB mode flag is set. A reproducing action begins.

Step #C-6: In the event of a continuous ON state of the PB mode setting switch 53, this step is repeated. The flow of operation comes back to the step #A-14 of FIG. 6 when the switch 53 is turned off.

Figure 11:
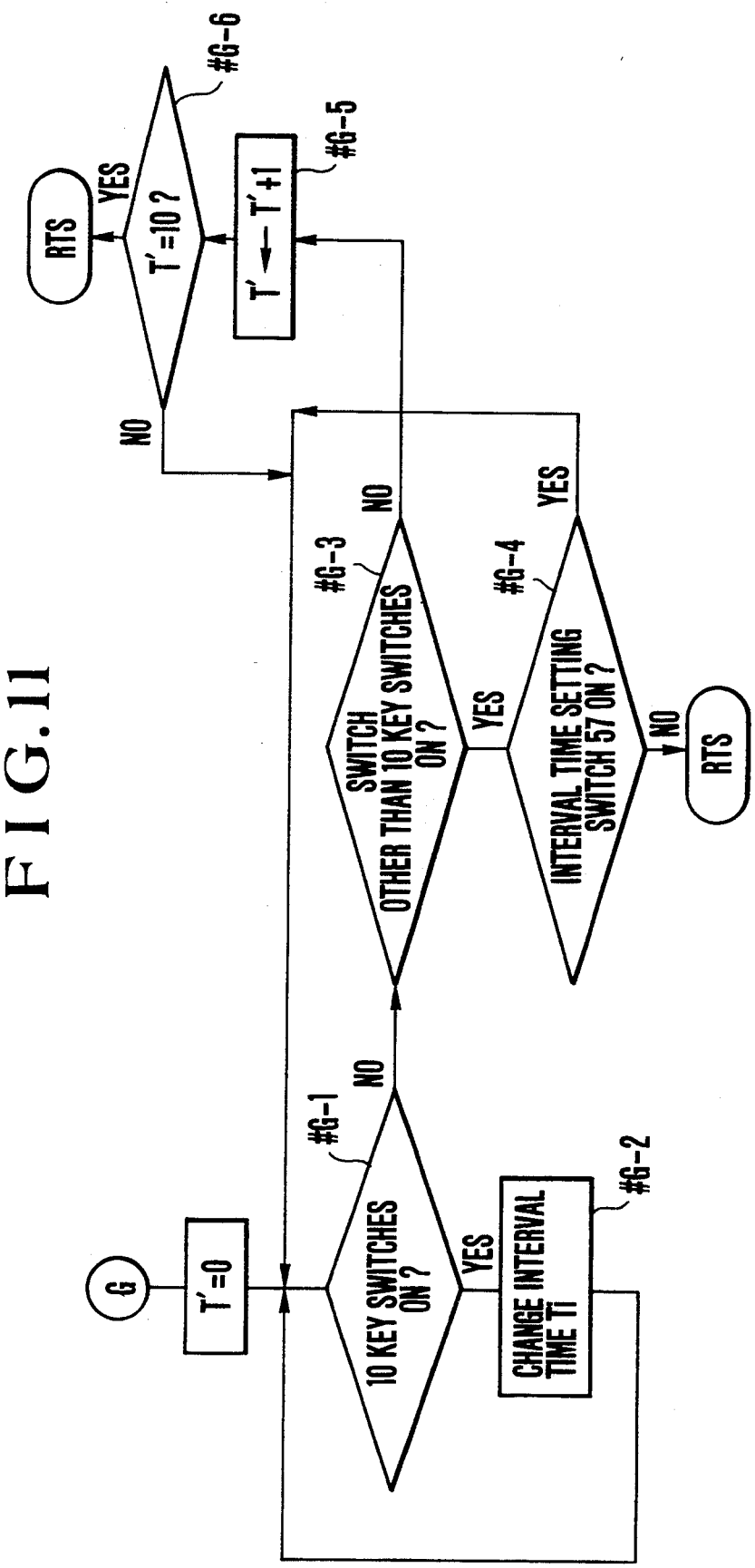

The subroutine (G) which is to be called out when the interval time setting switch 57 is turned on is as described below with reference to FIG. 11. the subroutine (G), the state of the timer T' is initialized and set at 0.

Step #G-1: The timer T' is initialized to zero with the interval time setting switch 57 having been found to be turned on at the step #A-7 of FIG. 6 before the flow of operation comes to this step #G-1. Then, if the ten key switch arrangement 63-72 is turned on, the flow proceeds to a step #G-2. If not, it branches out to a step #G-3.

Step #G-2: The interval time Ti is changed to another interval time value Ti set by the ten key switch arrangement 63-72.

Step #G-3: A check is made to find if any switch other than the ten key switch arrangement is turned on. If so, the flow of operation proceeds to a step #G-4. If not, it branches to a step #G-5.

Step #G-4: A check is made for the ON state of the interval time setting switch 57. If the switch 57 is found on, the flow of operation comes to the step #G-1. If not, it branches to the step #A-1 shown in FIG. 6.

Step #G-5: The value of the timer T' is increased by one and the flow of operation shifts to a step #G-6 after one second.

Step #G-6: The timer T' is checked to find if it is at a value 10. If so, the flow of operation comes to the step #A-1 of FIG. 6. If not, it comes to the step #G-1 to repeat the loop of steps #G-1, -3, -5 and -6. When the value of the timer T' become flow comes back to the step #A-1. Therefore, in the subroutine (G), if no other switch turns on in ten secononds after the interval time setting switch 57 is turned on, the flow of operation comes back to the step #A-1 of FIG. 6 and the interval time setting is cancelled. Further, in the subroutine (G), the track number display LED 25 may be arranged to display the interval time Ti.

Further, with the interval time Ti set at "0" in the subroutine (G), there obtains an external trigger mode in which, for example, the embodiment is connected to an external device such as a printer as will be described later as a reproducing action in a subroutine (K).

Figure 12:
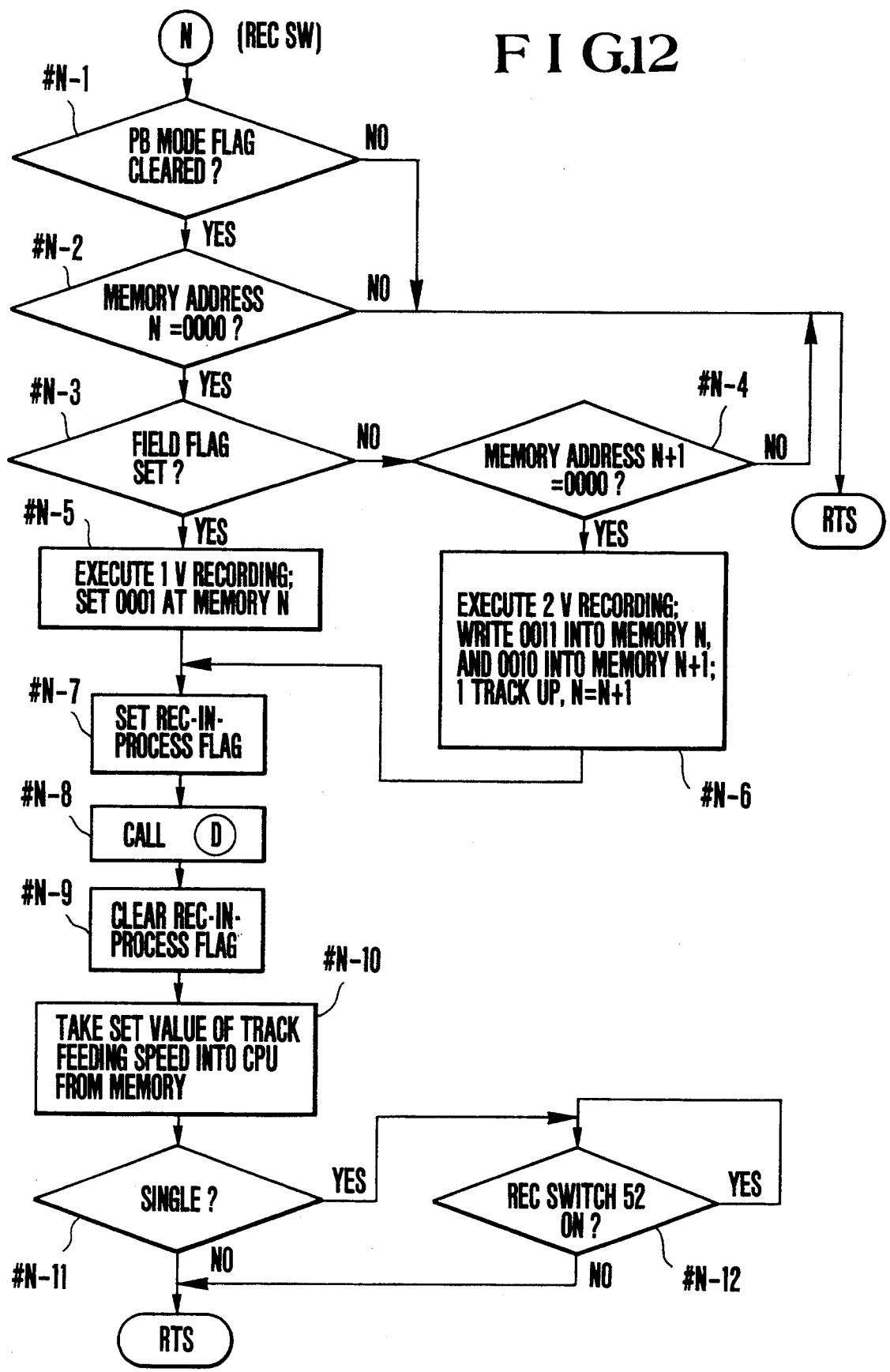

Referring now to FIG. 12, a subroutine (N) which is called when the REC switch is turned on is arranged as follows:

Step #N-1: The flow of operation comes to this step when the ON state of the REC switch 52 is detected at the step #A-2 of FIG. 6. A check is made for the cleared state of the PB mode flag. If the flag is not cleared thus indicating the existence of the reproduction mode, the flow comes back to the step #A-14 of FIG. 6 (RTS). If the flag is found to have been cleared, it proceeds to a step #N-2. Therefore, if the REC (recording) mode is not set, no recording action is performed even if the REC switch 52 is on.

Step #N-2: A check is made for "0000" of the memory address N which indicates that the head 3-1 has gained access to an unrecorded track. If the track accessed is found recorded, the flow of operation comes back to the step #A-14 of FIG. 6. If the track is unrecorded, the flow comes to a step #N-3.

Step #N-3: A check is made to see if the field flag is set. If so, the flow of operation comes to a step #N-5. If not, it proceeds to a step #N-4.

Step #N-4: The flow of operation comes to this step when the frame recording mode has been set. At this step, a check is made to find if the address N+1 of the memory is at "0000" thus indicating that the track accessed by the head 3-2 is unrecorded. If the track is not unrecorded, the flow of operation comes back to the step #A-14 of FIG. 6. If the track is unrecorded, the REC LED 44B has been flickering. In the case of the unrecorded track, the flow branches out to a step #N-6.

Step #N-5: One field portion of a video signal is recorded by the head 3-1 in the track to which the head 3-1 has access on the magnetic sheet 1.

Step #N-6: The frame recording mode has been selected when the flow of operation comes to this step. Therefore, the heads 3-1 and 3-2 record one-field portions of a video signal in two tracks on the magnetic sheet 1 respectively. Upon completion of recording, the stepping motor 24 is operated to shift the heads 3-1 and 3-2 inward to the extent of one track.

Further, in carrying out the steps #N-5 and -6, the switches SW2 to SW5 are operated in the manner as described with reference to FIG. 2.

Step #N-7: The REC-in-process flag is set.

Step #N-8: The subroutine (D) is called. If the head 3-1 has access to a track other than the 50th track, the flow of operation shifts from the steps #D-1 and -2 to the step #D-3. Then, the flow shifts from the step #D-3 to the step #D-13 to shift the heads 3-1 and 3-2 inward to the extent of one track. In the case of the frame recording mode, the heads 3-1 and 3-2 have already been shifted inward to the extent of one track at the step #N-6. In that case, therefore, the head 3-1 comes to gain access to a track located next to the track recorded at the step #N-6 although the embodiment is in the frame recording mode. In the event that the tracks to be used for recording by the heads 3-1 and 3-2 already have existing records, the REC LED 44B which is shown in FIG. 3 make a blinking display to give a warning to the operator. After that, the flow of operation branches from the step #D-15 to the step D-19 and then from the step #D-19 to the steps #D-2 to #D-34 to carry out these steps. More specifically, in case that the track feed speed setting value is for a single performance, the flow branches from the step #D-21 to the step #D-34. Then, in accordance with the REC-in-process flag which has been set at the step #N-7, the flow comes back to the step #N-9. In case that the track feed speed for two picture planes per second or five picture planes per second has been set, subtraction is made from the value of the wait timer register as much as a period of time required for recording at the step #D-28. With the value of the wait timer register down counted, when the value of the register becomes zero, the flow of operation comes back from the step $\phi$D-33 via the step #D-34 to the step #N-9 according to the REC-in-process flag set at the step #N-7 in the same manner as mentioned above.

Step #N-9: The REC-in-process flag is cleared.

Step #N-10: The step is similar to the step $\phi$D-20. Data of the track feed speed setting value is taken in from the memory.

Step #N-11: If the track feed speed setting value is for a single performance, the flow of operation comes to a step #N-12. If not, it comes back to the step #A-14 shown in FIG. 6.

Step #N-12d: With the track feed speed set for the single performance, this step is repeated to prevent recording from being performed by repeating this step to have the subroutine (N) carried out.

In case that the track feed speed is set at a value not for the single performance and that the REC switch 52 is in an ON state, the flow comes from the step #N-11 via the step #N-14 to the step #A-1. Then, at the step #A-2, the subroutine (N) is called out to carry out the subroutine. Thus, as long as the REC switch 52 remains in the ON state, recording is continuously performed at the set track feed speed. If the REC switch 52 is in an OFF state, the flow of operation comes from the step #N-12 to the steps #A-14, #A-1 and #A-2. However, the continuous recording comes to an end at the step #A-2 without calling the subroutine (N).

Figure 13:
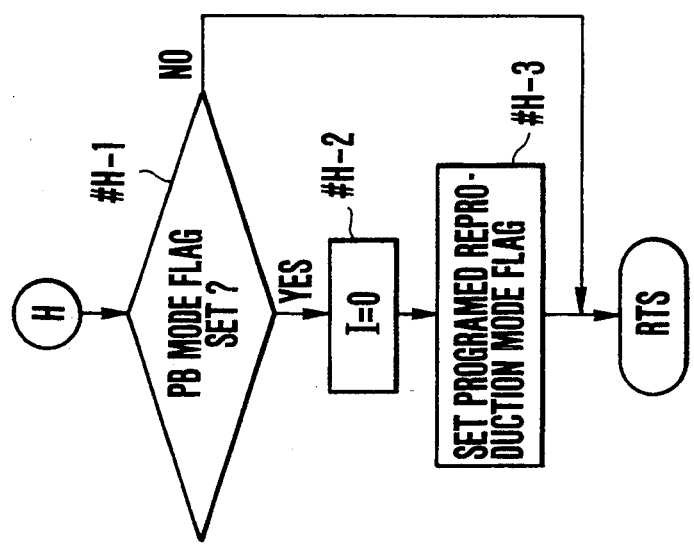

Referring to FIG. 13, a subroutine (H) which is called when the program setting switch 58 is turned on is arranged as described below:

Step #H-1: When the program setting switch 58 is found to have been turned on at the step #A-8 of FIG. 6, the flow of operation comes to this step. A check is made to find if the PB mode flag has been set. If so, the flow proceeds to a step #H-2. If not, it comes back to the step #A-1 of FIG. 6 (RTS). This step #H-1 is provided for inhibiting program setting in the recording mode. In this embodiment, the reproduction mode must be selected before setting a program. Then, program setting is performed while confirming on a monitor the video signal recorded in the magnetic sheet 1.

The change-over to the reproducing mode can be automatically effected by automatically setting the PB mode flag when the program setting switch 58 is turned on. For this automatic shift, the step #H-1 may be replaced with a step similar to the step #C-5.

Figure 14:
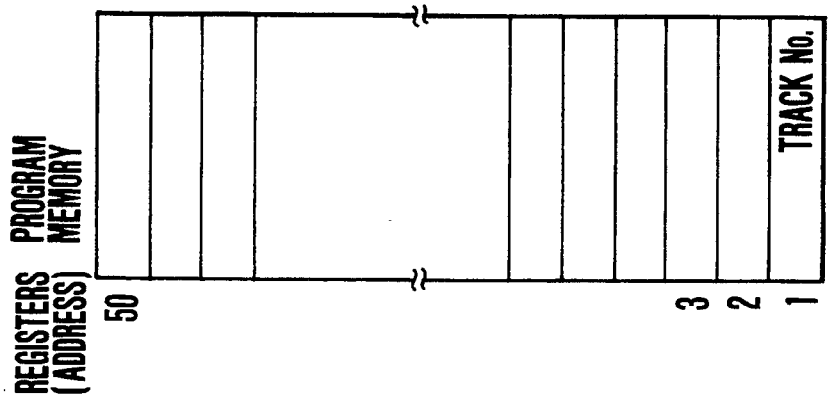
FIG. 14 is a schematic illustration of arrangement of a program memory.

Step #H-2: During the process of programed reproduction using a programed track memory which is arranged to store a program as shown in FIG. 14, the content of a register I showing an address of the programed track number at which the number of a track to be next reproduced is changed to zero.

Step #H-3: A programed reproduction mode flag which indicates selection of the programed reproduction mode is set. The flow then comes back to the step #A-1.

FIG. 15 is a flow chart showing a subroutine (I) which is to be called when the programed track setting switch 62 is turned on after the programed reproduction mode is set by the subroutine (H). The subroutine (I):

Step #I-1: A check is made to see if the programed reproduction mode flag has been set. If so, the flow of operation proceeds to a step #I-2. If not, it branches out to the step #A-1. Therefore, with the programed reproduction mode not set by the program setting switch 58, no program setting action is performed even when the programed track setting switch is operated.

Step #I-2: A register S which is initially set at a state of S=0 when the power supply is switched on at the step #1 indicates the foremost address storing the program of the above stated programed track memory. At the step #I-2, data which is the same as the content of the register S is written into a register M.

Step #I-3: The data of the programed track memory stored at the register M is stored at an address which is larger by one than the above stated address. In other words, the track number indicating data stored at the programed track memory is stored at another address which is larger by one than the address storing the data.

Step #I-4: A value obtained by adding one to the content of the register M is written into a register I.

Step #I-5: One is subtracted from the content of the register M.

Step #I-6: A check is made as to whether or not the content of the register M is not greater than zero. If it is found zero or less than zero, the flow proceeds to a step #I-7. If it is found greater than zero, it branches out to the step #I-3.

The loop of steps #I-3 to #I-6 are repeated until the content of the register becomes zero. When it becomes zero, all the data stored at the addresses of the programed track memory are respectively transferred to addresses larger by one. Therefore, when the flow comes from the step #I6 to a step #I-7 after repeating the loop of steps, no data is stored at the address 1 of the programed track memory.

Step #I-7: The number of a track to which the head 3-1 has access is stored at the address 1 of the programed track memory. Therefore, with the programed track setting switch 62 turned on, the number of a track having the recorded video signal thereof being reproduced by the head 3-1 is programed.

Step #I-8: One is added to the content of the register S. With this step performed, the foremost address (the largest address) of data of the programed track memory shifted by execution of the loop of steps #I-3 to #I-6 is always stored at the register S.

Step #I-9: This step is repeated while the programed track setting switch 62 is in an ON state. When the switch turns off, the flow of operation comes back to the step #A-1.

In case that the operator further proceeds with program setting, the track UP switch 54 or the track DOWN switch 55 is turned on to change the tracks to which the heads 3-1 and 3-2 are to be shifted. When reproduction is made from a desired track, program setting can be accomplished by turning on the programed track setting switch 62 while confirming a picture thus reproduced.

The data stored at each of addresses of the programed track memory shown in FIG. 14 comes to be stored at a larger address one by one every time the programed track setting switch 62 is turned on. During the process of program setting, the registers S and I have exactly the same content as each other.

Figure 16:
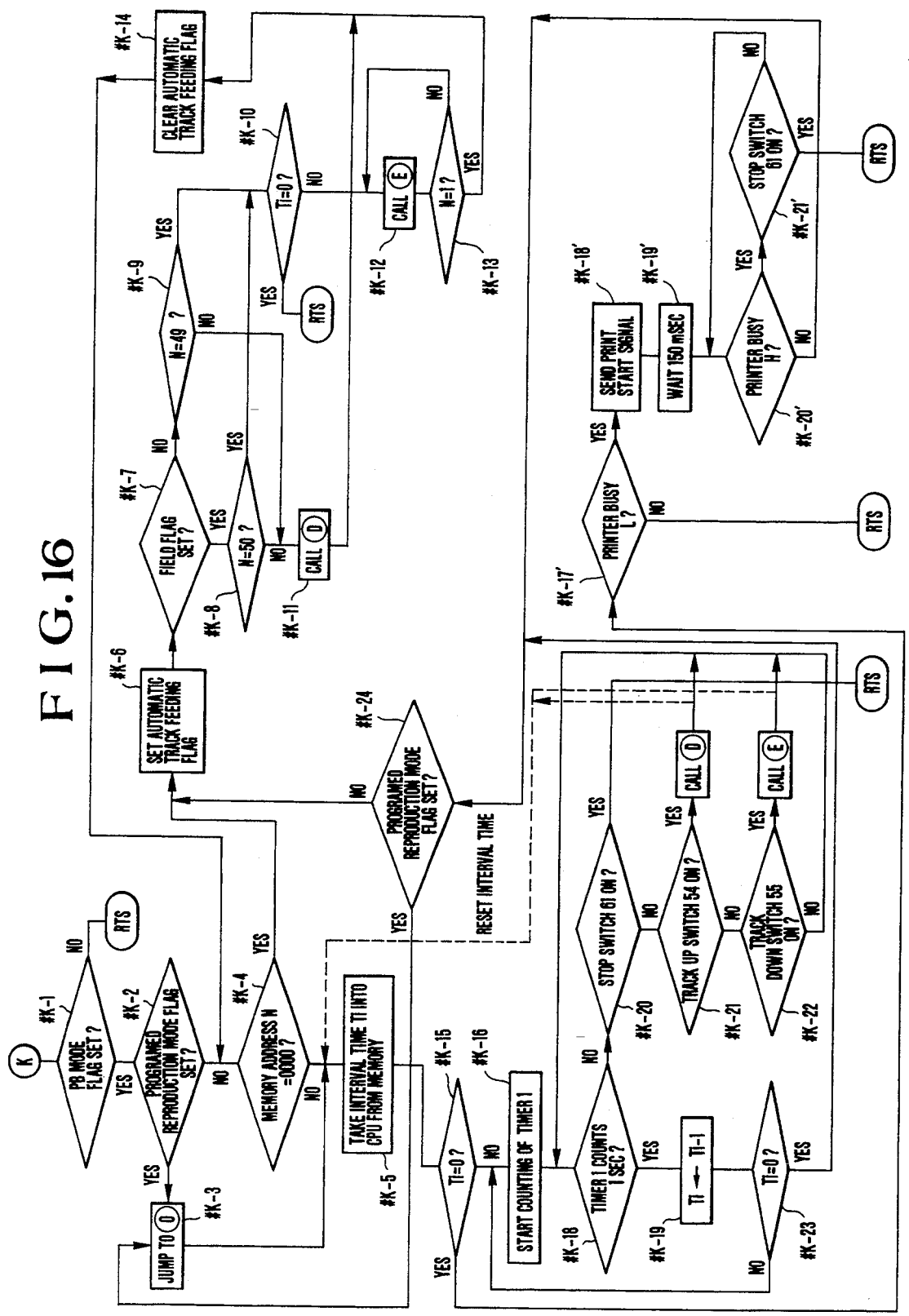

With a program set by turning on the program setting switch 58 and the programed track setting switch 62, the program is reproduced by a program reproducing operation. Programs for execution of the programed reproduction and an interval reproducing operation which is carried out by reproducing records at set intervals one after another from recorded tracks accessed by the heads 3-1 are as described below with reference to FIGS. 16 to 18:

FIG. 16 shows a subroutine (K) which is called when the start switch 60 is turned on. The subroutine (K) consists of the following steps:

Step #K-1: With the start switch 60 found to have turned on at the step #A-11 of FIG. 6, the flow of operation comes to this step to make a check to see if the PB mode flag has been set. If not, the flow comes to the step #A-1. If the flag is set, the flow comes to a step #K-2. In this embodiment, therefore, neither interval reproduction nor programed reproduction are possible if the reproduction mode is not set. Therefore, interval reproduction or program reproduction can be prevented from being accidentally started even if the start switch 60 is turned on by mistake when the embodiment is in the recording mode. This arrangement, however, may be changed to permit starting interval reproduction or programed reproduction immediately by just turning on the start switch without setting the reproduction mode set beforehand. In the case of that modification, the step #K-1 is replaced with a step similar to the step #C-5.

Step #K-2: A check is made to see if the programed reproduction mode flag has been set. If so, the flow proceeds to a step #K-3. If not, it branches to a step #K-4. In the case that the programed reproduction mode flag is not set, i.e. in carrying out interval reproduction, the flow of operation takes place in the following manner:

Step #K-4: A check is made to see if the address N of the memory is at "0000" indicating that the head 3-1 has gained access to an unrecorded track. If so, the flow of operation comes to a step #K-6. If not, it proceeds to a step #K-5. In the case that the track accessed by the head 3-1 is not recorded, the flow of operation from the step #K-6 is as follows:

In the embodiment described below, if the track accessed by the head 3-1 is not the 49th nor 50th track, only recorded tracks are reproduced one after another beginning with the accessed track. If the track is either the 49th or 50th track, recorded tracks are reproduced beginning with the first track. However, this arrangement can be changed to have the reproduction of recorded tracks begin always from the first track by inserting an additional step of driving the stepping motor 24 to cause the head 3-1 to gain access to the first track in between the steps #K-2 and #K-4.

This arrangement is highly advantageous in carrying out a look-up operation by automatic interval reproduction starting with the first track one after another in the event that the head 3-1 has access to a track other than the first track.

Step #K-6: An automatic track feeding flag is set indicating that an interval reproducing operation is in process.

Step #K-7: A check is made to see if the field flag has been set. If so, the flow of operation proceeds to a step #K-8. If not, it branches to a step #K-9.

Step #K-8: The register N is checked to find if it is at 50 thus indicating that the track accessed by the head 3-1 is the innermost track. If so, the flow of operation comes to a step #K-10. If not, it comes to a step #K-11.

Step #K-9: The register N is checked to find if it is at 49 thus indicating that the track accessed by the head 3-1 is in the innermost position but one. If so, the flow proceeds to the step #K-10. If not, it comes to the step #K-11.

Step #K-10: The interval time Ti which is set by execution of the subroutine (G) is checked to find if it is at "0" thus indicating a mode in which the head 3-1 is to be shifted in accordance with a preset program in response to an external trigger signal as will be described later. If the interval time Ti is set at "0" because of that mode, the flow branches out to the step #A-1. If not, it comes to a step #K-12.

Step #K-11: The subroutine (D) is called to execute steps #D-1 to #D-18. The PB mode flag is set when the subroutine (D) is called during the execution of the subroutine (K). Therefore, the flow of operation branches from the step #D-2 to the step #D-9. Then, the heads 3-1 and 32 are shifted inward to an extent of two tracks at steps #D-12 and #D-13 if a track located more inward by one track than the track accessed by the head 3-1 is found to be the inner side track of the two tracks having a frame video signal recorded therein and if the head 3-1 is not having access to the 49th track at the step #K4. If not, the heads 3-1 and 3-2 are shifted inward to an extent of only one track at the step #D-13. Further, if a frame video signal is recorded in the tracks accessed by the heads 3-1 and 3-2, the field flag is cleared and the flow of operation shifts from the step #D-19 to a step #K-14.

Step #K-12: The subroutine (E) is called. The steps #E-1 to #E-13 and #D-14 to #D-19 are carried out. In case that a frame video signal is found at the step #K-4 to be recorded in two tracks located adjacent to and on the outer side of a track accessed by the head 3-1, the heads 3-1 and 3-2 are shifted outward to the extent of two tracks at steps #E-12 and #E-13. With the exception of this case, the heads are shifted outward to the extent of only one track. Further, like in the case of the step #K-11, if a frame video signal is recorded in the tracks accessed by the heads 3-1 and 3-2, the field flag is cleared and the flow shifts from the step #D-19 to a step #K-13.

Step #K-13: The content of the register N is checked to see if it is 1 thus indicating that the track accessed by the head 3-1 is the outermost track. If so, the flow proceeds to a step #K-14. If not, it branches out to the step #K-12. Therefore, in case that the flow of operation branches to the step #K-12 from the step #K-8 or #K-9 with the head 3-1 gaining access to the 49th or 50th track, the steps #K-12 and #K-13 are repeated to bring the head 3-1 to the first track.

Step #K-14: The automatic track feeding flag is cleared.

As mentioned above, when the flow of operation comes from the step #K-4 to the step #K-5 with the steps #K-4 to #K-14 carried out, the head 3-1 comes to have access to a track having a video signal recorded therein. All the tracks having no video signal recorded therein are skipped over and substantially not reproduced.

Further, when the flow comes from the step #K-4 to the step #K-5 with the steps #K-4 to #K-14 executed, if a frame video signal is recorded in two tracks accessed by the heads 3-1 and 3-2, the filed flag has been cleared at the step #D-18 of the subroutine (D). In that event, therefore, a frame reproduction mode is automatically set. Further, if field video signals are recorded in tracks accessed by the heads 3-1 and 3-2, a field reproduction mode is automatically set. In the event of interval reproduction, therefore, the embodiment is automatically set in the optimum reproduction mode according to the manner in which the video signal is recorded.

Step #K-5: The interval time Ti set by the subroutine (G) is taken into the CPU 40 from the memory.

Step #K-15: A check is made to see if the interval time Ti is at "0" in a manner similar to the step #K-10. If so, the flow branches out to a step #K-17. If not, it comes to a step #K-16. Assuming that no external trigger mode is set in this case, the flow of operation at the step #K-16 and steps ensuing it is as follows:

Step #K-16: The timer 1 begins to count time. The flow comes to a step #K-18.

Step #K-18: A check is made to see if the timer 1 has counted one secondond. If so, the flow proceeds to a step #K-19. If not, the flow branches out to a step #K-20.

Step #K-20: A check is made to see if the stop switch 61 is in an ON state. If so, the flow branches out to the step #A-1. If not, it comes to a step #K-21. With the flow branches to the step #A-1, the steps #A-1 to #A-12 are executed. Therefore, when the stop switch 61 is turned on under a normal condition, the flow calls a subroutine (M) at the step #A-12. The subroutine (M) is as described below with reference to FIG. 17:

Step #M-1: A check is made to see if the programed reproduction mode flag is set. If not, the flow comes to the step #A-14. If the flag is set, the flow proceeds to a step #M-2.

Step #M-2: A check is made to see if a programed reproduction execution flag is set. If so, the flow proceeds to a step #M-3. If not, it branches out to a step #M-4.

Step #M-3: The content of the register I is equalized with that of the register S.

Step #M-4: The content of the register S is shifted to zero. Then, the step #M-3 is executed.

Further details of the subroutine (M) will be described later along with the programed reproduction mode. The flow of operation at a step #K-21 and steps ensuing it is as follows:

Step #K-21: A check is made to see if the track UP switch 54 is on. If the switch is found to be on, the subroutine (D) is called to shift the heads 3-1 and 3-2 inward. If not, the flow proceeds to a step K-22.

Step #K-22: The track DOWN switch 55 is checked to see if it is on. If it is, the subroutine (E) is called to shift the heads 3-1 and 3-2 outward. If not, the flow of operation branches out to the step #K-18.

Step #K-19: One is subtracted from the interval time Ti taken in from the memory.

Step #K-23: If the interval time Ti is zero, the flow proceeds to a step #K-24. If not, the flow branches to the step #K-16.

During interval reproduction, images recorded in tracks neighboring the tracks under the reproducing operation thus can be reproduced by turning on the track UP switch 54 and the track DOWN switch 55 with the above stated steps #K-15 to #K-23 carried out. In that instance, the track to be reproduced at the track feeding speed set by the subroutine (F) can be automatically renewed from one track to another by keeping the switch 54 or 55 in its ON state. Therefore, an image preceding by several picture planes can be readily reproduced during the interval reproduction.

Further, in reproducing the images recorded in the tracks neighboring the track under the reproducing operation by turning on the track UP switch 54 and the track DOWN switch 55, if the reproducing operation is performed for the remaining period of the interval time Ti of the track under the reproducing operation, the flow of operation according to the arrangement of this embodiment shifts from the step #K-23 to the step #K-24 to renew the reproducing track. However, this arrangement may be changed to reset the interval time Ti to enable the operator to observe the image renewed by the switch 54 or 55 for a predetermined period of time without fail by allowing the flow of operation to jump to the step #K-5 as indicated by a broken line in FIG. 16.

Step #K-24: At the time of renewal of the reproducing track after the end of the interval time Ti, a check is made to see if the programed reproduction mode has been set. If so, the flow branches to the step #K3. If not, it branches to the step #K-6.

Figure 18:
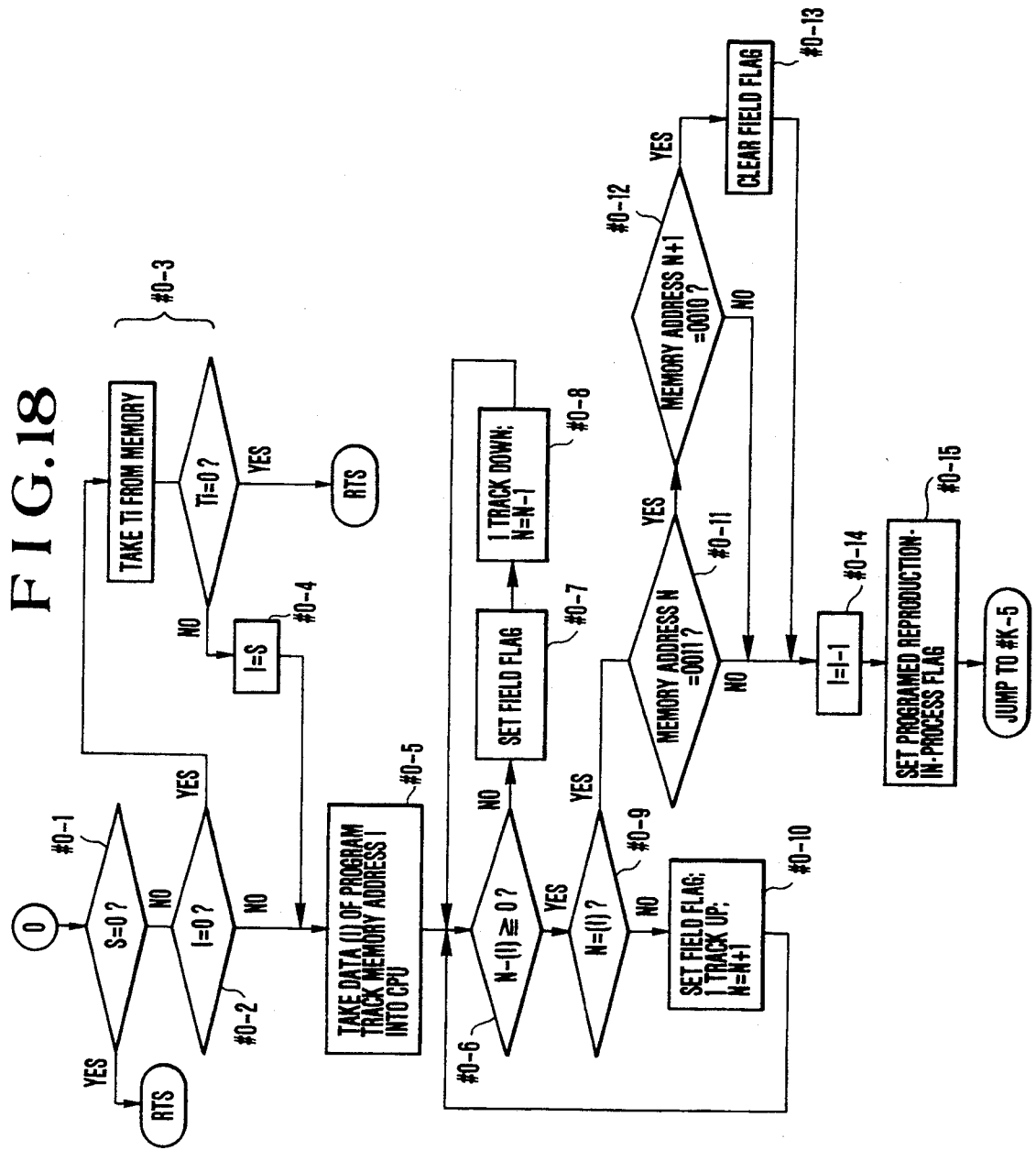

FIG. 18 shows a subroutine (O) which is called when the programed reproduction mode flag is found to be not set at the step #K-2. The subroutine (O) is as described below with reference to FIG. 18:

Step #0-1: The register S is checked to see if its content is "0". If so, the flow comes to the step #A-1. If not, it proceeds to a step #O2. As mentioned in the foregoing, the foremost address of the programed track memory at which a program is set is stored at the register S. When the content of the register S is "0", it indicates that no program is stored. In this instance, therefore, the flow of operation comes back to the subroutine (A).

Step #0-2: A check is made to see if the content of the register I is "0". If so, the flow proceeds to a step #O-3. If not, the flow branches out to a step #O-5.

As mentioned in the foregoing, the address of the track memory storing the number of a track to be next reproduced during the execution of programed reproduction is stored at the register I. During the programed reproduction, one is subtracted from the register I every time one step of programed reproduction is performed. Therefore, the fact that the flow comes to the step #O-2 and the register I is found to be at "0" does not indicates that the register S is at "0" with a program set but indicates completion of execution of one round of steps of programed reproduction. In other words, with the programed reproduction having been performed once, the flow of operation comes to a step #O-3. If the programed reproduction is still in process, the flow branches to a step #O-5.

Step #O-3: The interval time Ti set by the subroutine (G) is taken in. A check is made to see if the interval time Ti is at "0". If so, the flow comes to the subroutines (O) and (K) and then comes back to the step #A-1 to complete the programed reproduction.

Therefore, in the external trigger mode which is set with the interval time set at "0", a program reproducing operation comes to a stop upon completion of execution of one round of the programed reproduction.

In the case of normal programed reproduction for which the interval time Ti is set at a value other than "0", the flow shifts to a step #O-4.

Step #O-4: The content of the register S is written into the register I. Then, the programed action is resumed.

Step #O-5: The data (I) of an address of the programed track memory which is set at the register I (indicating data written in an address set at the register I of the programed track memory by parenthesizing I) is read out.

Step #O-6: the data (I) is subtracted from the content of the register N indicating the number of a track to which the head 3-1 presently gains access. If the result of subtraction is not less than "0", the flow comes to a step #O-9. If it is less than "0", the flow comes to a step #O-7.

Step #O-7: The field flag is set for the purpose of inhibiting the heads from being shifted in the frame mode in the same manner as in the case of the step #D-8.

Step #O-8: The heads 3-1 and 3-2 are shifted outward to an extent corresponding to one track.

Step #O-9: A check is made to see if the number of a track to which the head 3-1 has access as indicated by the register N is equal to the data (I). If so, the flow comes to a step #O-11. If not and the data (I) is larger, the flow comes to a step #O-10.

Step #O-10: The heads 3-1 and 3-2 are shifted inward to the extent corresponding to one track.

Steps #O-11, #O-12 and #O-13: These steps are similar to the steps #D-16, #D-17 and #D-18. Either frame reproduction or field reproduction is automatically performed according to whether the video signal recorded by these steps is a frame video signal or field video signal.

Further, the head 3-1 is controlled by repeating the steps #O-6 to #O-10 to have access to tracks programed at the programed track memory.

Steps #O-14: One is subtracted from the register I. With this step performed, the flow can be branched by making a check at the step #K-24 to see if the program reproduction mode flag is set.

Step #0-15: A programed reproduction-in-process flag is set.

Therefore, when the subroutine (O) is called at the step #K-2, a check is first made for an actual set state of a reproduction program. Further, a check is made to see if the external trigger mode has been set. If the external trigger mode is found to have been set, the program is executed only once. With the exception of this, the programed reproduction is performed in a repeating manner.

The flow of operation in the external trigger mode is as follows: In this instance, the flow branches from the step #K-15 to a step #K-17'.

Step #K-17': A check is made to find whether a printer connected to the embodiment as an external device is busy (performing a printing action). If so, the flow of operation comes to the step #A-1. If not, it branches out to a step #K-18'.

Step #K-18': A print start signal is sent to the printer. The print start signal can be sent by making high the signal level of a terminal connected to the printer.

Step #K-19': There obtains a wait state for 150 m.second.

Step #K-20': If the printer is busy, the flow of operation comes to a step #K-21'. If not, the flow branches out to a step #K-24.

Step #K-21': The stop switch 61 is checked for an ON state thereof. If not, the flow comes to the step #K-20'. If the switch 61 is found to be turned on, the flow comes back to the step #A-1.

If the printer which is connected as an external device is found busy in executing the steps #K-17' to #K-21', the flow of operation comes back to the step #A-1 as mentioned above. In that instance, the flow shown in FIG. 16 is repeated until another switch is turned on. During this repeating process, when the start switch is again turned on, the above stated flow of operation is repeated to carry out the step #K-17'.

In case that the printer is not connected as an external device, a terminal which is arranged to receive a signal from the busy signal output terminal of the printer 13' as shown in FIG. 1 opens to have a high level there. This causes the flow of operation to come back to repeat the above stated flow. Therefore, in the event that no external device such as the printer is connected although the external trigger mode is set, the record of the tracks to which the heads 3-1 and 3-2 have access is continuously reproduced and the reproducing tracks are not renewed.

Further, with the printer connected as an external device, if the printer is not busy and the flow proceeds from the step #k-17' to the step #K-18', a printer start action begins when the the wait time of 150 m.second of the step #K-19' elapses after a print start signal is applied to the printer. Then, when the printer thus becomes busy, the steps #K-20' and #K-21' are repeated until either the action of the printer comes to an end or the stop switch 60 is turned on. When the action of the printer comes to an end, the flow branches from the step #K-20' to a step #K-24. At this step, a check is made to find if the programed reproduction mode has been set. If so, the flow branches to the step #K-3. If not, it branches to the step #K-6. Further, in case that the stop switch 60 is turned on, the flow of operation is performed in the same manner as described in the foregoing.

When the external trigger mode is selected in the programed reproduction mode, programed reproduction is performed and comes to a stop at the end of one performance of reproduction as mentioned at the step #O-3 in the foregoing.

In accordance with the arrangement of this embodiment, even in case that the programed reproduction mode is not set while the external trigger mode has been selected, the provision of the step #K-10 brings a reproducing operation to a stop when the records of the tracks are reproduced one after another once from the tracks accessed by the heads 3-1 and 3-2 to the last track. Therefore, in the external trigger mode, reproduction comes to a stop irrespective as to whether the programed reproduction is set or not set. Therefore, with a printer used as an external triggering device, printing is performed only once.

In cases other than the external trigger mode, after reproduction is performed once in the predetermined sequence, reproduction is again performed from the beginning irrespective as to whether the programed reproduction mode is set or not set. Therefore, with the exception of the external trigger mode, the so-called endless reproduction can be performed as the reproduction is thus arranged to be repeated in the predetermined sequence.

While the printer is described by way of example as an external triggering device usable in combination with the embodiment, the external device is not limited to a printer but may be a device having an electrically transmitting function or a device for processing a reproduced signal.

In the embodiment described, a disc-shaped magnetic sheet having a plurality of tracks in which blocks of information are recorded is employed as a storage medium. However, in accordance with this invention, the storage medium may be an optical medium such as an optical disc or may be a tape-shaped storage medium or a solid state memory such as a semiconductor memory.

As regards the reproducing means for reproducing information from the storage medium, suitable means is selected according to the kind of the storage medium employed. For example, a magnetic head is used if a magnetic storage medium is employed. An optical head is used for optical storage medium. In the event of a solid-state memory, means for having access to each of blocks of the memory is used as the reproducing means.

In accordance with the arrangement of this embodiment, as mentioned in the foregoing, a recording speed is selectable from among single performance speeds for two picture planes per second, for five picture plane per second and for ten picture planes per second in the case of the field recording mode; and between single performance speeds for two picture planes per second and for five picture planes per second in the case of the frame recording mode. In case that the field recording mode is changed over to the frame recording mode when the recording speed for ten picture planes per second is set in the field recording mode, the recording speed is automatically changed to the speed for five picture planes per second. The recording speed is thus effectively inhibited from being set at a speed for ten picture planes per second in the frame recording mode. Further, these setting values are arranged to be displayed by means of the two-place, seven-segment LED as shown in FIG. 3. This display arrangement ensures excellent operability for the operator.

In the embodiment described, a first recording mode in which a predetermined amount of information is to be recorded is arranged to be the field recording mode and a secondond recording mode in which a greater amount of information is to be recorded as the frame recording mode. However, the first and secondond recording modes according to this invention is of course not limited to the field and frame recording modes.

Further, in this embodiment, the control means for repeating the recording operation in the first or secondond recording mode at a predetermined speed is arranged in the form of the subroutine (D) or (E) shown in Figs. 8A and 8B. Further, the recording speed setting means of this embodiment is arranged to be the track feed speed setting switch 56 and the subroutine (F) which is called by turning on the switch 56. However, the recording speed may be arranged to be directly set, for example, by means of ten key arrangement or some other suitable means, such as mechanical setting means operated by a dial or the like. When a recording speed at which the embodiment is inoperable in the secondond recording mode is set after change-over from the first recording mode to the secondond recording mode, the embodiment performs the subroutine (J) shown in FIG. 9 and more particularly the steps #J-1, -5, -6 and -7 of the subroutine.

Further, the embodiment is arranged to limit the recording speed setting range of the secondond recording mode to be narrower than that of the first recording mode by the subroutine (F) and particularly by the steps #F-16, -19 and -18 of the subroutine. However, in accordance with this invention, this arrangement may be replaced with some hardware logic arrangement or with some mechanical means for mechanically limiting the rotation of a dial in case where the recording speed is to be mechanically set by a dial.

In accordance with the arrangement of this embodiment, the recording speed is controlled within an apposite setting range according to the recording mode selected. Therefore, the apparatus is effectively prevented from being set at an inoperable recording speed.

In the embodiment, when a signal designating a sequence in which the blocks of information recorded on the recording medium is to be reproduced is stored in storage means, the information recorded in each of the blocks is reproduced according to the designating signal. Therefore, unlike the conventional arrangement wherein a program setting action is performed separately from a reproducing action on recorded information, the embodiment has an excellent operability.

The conventional reproducing apparatuses for reproducing recorded information from a storage means which has information recorded in a plurality of blocks include the reproducing apparatus of the kind reproducing a still picture signal recorded on a magnetic sheet called a SV floppy disc like in the case of this embodiment. The apparatus of this kind can be arranged to have an automatic reproducing function whereby reproduction is either continuously performed for a predetermined period of time at a time from tracks beginning with a first track one after another or, as known for record players, performed in accordance with a program defining a predetermined reproducing sequence.

In setting a program with a predetermined reproducing sequence, the program can be set without difficulty if what is recorded in which of the blocks is known beforehand. If not, it is necessary to reproduce the recorded information for confirmation of records of these blocks in setting the program. However, in accordance with the arrangement of the conventional apparatus, a reproducing action on recorded information is performed separately from a program setting action. This has presented a problem in terms of operability. Whereas, this embodiment solves the problem by reproducing the recorded information in storing the reproducing sequence of these blocks at the storage means as mentioned above.

Further, the programed track memory shown in FIG. 14 is arranged to store the signal designating the reproducing sequence of blocks through the execution of the subroutines shown in FIGS. 13 and 15. In storing the reproducing sequence designating signal at the storage means, control means which causes the above stated reproducing means to reproduce the information recorded in the block according to the designating signal is arranged to be the step #I-7 whereby the number of a track accessed by the head 3-1 is stored at the address 1 of the programed track memory when the programed track setting switch 62 is turned on in the PB mode which has been set at the step #H-1. In short, in the case of this embodiment, the signal designating the reproducing sequence, i.e. the number of a block being reproduced is arranged to be stored at the storage means by turning on the programed track setting switch under the condition of having the record of a desired block reproduced from a record bearing medium. However, this arrangement may be changed to enable the reproducing means to automatically perform reproduction according to the number by storing at the storage means the number of each block desired to be included in setting up a program.

As mentioned in the foregoing, it is an advantageous feature of this embodiment that: If a reproducing block is changed over to another block by a shifting instruction while reproduction is being performed in a predetermined sequence, the record of the new block is reproduced only for a predetermined period of time and, after the lapse of the predetermined period of time, the reproduction in the predetermined sequence is resumed. This arrangement gives an advantages in terms of operability, because:

The conventional reproducing apparatuses for reproducing information from storage means which has information recorded in a plurality of blocks therein include the reproducing apparatus for reproducing a still picture signal recorded in each of tracks formed on a magnetic sheet called an SV floppy disc as in the case of the present embodiment of this invention. In the conventional reproducing apparatus of this kind, a control circuit is provided for causing a reproducing sequence designating signal for still pictures recorded in the tracks of the magnetic sheet to be reproduced at predetermined time intervals from the tracks of the magnetic sheet starting with the first track thereof. Further, if a shift instruction is generated at a point of time halfway in the predetermined period of time of reproduction from one of the tracks of the magnetic sheet, the reproducing track is changed from the present track to another. In that event, therefore, the apparatus cannot be brought back to a state of reproducing in the predetermined sequence with the record of the present track further reproduced at the time of change-over of the reproducing track (or block). Whereas, in accordance with the arrangement of the embodiment of this invention, even in case that the record of another block is reproduced in response to a shift instruction, the reproducing means resumes reproduction in the predetermined reproducing sequence in response to a signal from a signal generating means which generates the signal again designating the reproducing sequence after the lapse of a predetermined period of time from the receipt of the shift instruction. The operability of the apparatus is improved by this.

Further, in the embodiment, when the programed reproduction mode is set, signal generating means for generating a signal according to a designated reproducing sequence includes the programed track memory shown in FIG. 14; the subroutine (K) is called out when the start switch 60 is turned on; and the subroutine (D) which is further called in the subroutine (K) and is arranged to gradually read out the program from the track memory. If the programed reproduction mode is not selected, the signal according to the designated reproducing sequence is generated for automatic renewal of the reproducing track by the steps #K-4 to -14 of the subroutine (K) which is called when the start switch 60 is turned on. The means for generating the shift instruction is arranged to comprise the track UP switch 54 and the track DOWN switch 55. The control means for causing the reproducing means to perform a reproducing action for a predetermined period of time on a block other than a block presently under reproduction when the above stated shift instruction is generated at a point of time halfway in the process of reproduction and to resume the original reproducing operation according to the signal from the above stated signal generating means includes the subroutine (K) and particularly the subroutines (D) and (E) to be called out at the steps #K-15 to #K-24 and steps #K-21 and -22 of the subroutine (K). The above stated predetermined period of time may be the interval time set for reproduction of records of blocks in the designated sequence as mentioned in the description of the step #K-23 or may be the remainder of the interval time left for the block under reproduction when the shift instruction is generated, or may be any other set period of time.

In this embodiment, the action of the recording or reproducing means such as a recording or reproducing period is controlled by controlling a motor with the output of a reference signal generator. Therefore, the embodiment dispenses with any additional time counting circuit specially for that purpose. More specifically, a recording or reproducing apparatus for recording or reproducing information on or from a medium necessitates use of various timers, for example, in setting a period of time for reproducing signals recorded on a recording medium or in setting a timing for recording a signal on the recording medium. Generally, a time counting circuit is arranged specially for that purpose. However, the use of this circuit has resulted in a more complex arrangement of the apparatus. Whereas, in this embodiment, the arrangement in combination of the means for recording or reproducing with either the recording medium or the recording head rotated to shift its position relative to the other; first signal generating means for generating a first signal every time the rotation comes to a predetermined phase; reference signal generating means for generating a reference signal for controlling the rotation; first control means for controlling the rotation by comparing the phase of the first signal with that of the reference signal; and secondond control means for controlling the action of the recording or reproducing means by counting the reference signal obviates the necessity of the time counting (or timer) circuit mentioned above.

In case that the first signal cannot be obtained with neither the recording medium nor the recording head is rotated when the recording or reproducing period of time is to be controlled by counting the first signal generated by the first signal generating means, it is impossible to control the action of the recording or reproducing means, such as a recording or reproducing period of time. However, since the embodiment is arranged to count another reference signal separately from counting the first signal generated by the first signal generating means, the action of the recording or reproducing means such as the recording or reproducing period of time still can be controlled even in that event.

In the embodiment described, the means of recording or reproducing by rotating either the recording medium or the recording head to shift its position relative to the other consists of a rotary magnetic sheet 1 and the heads 3-1 and 3-2 which are arranged to record or reproduce signals on or from the magnetic sheet 1. However, in accordance with this invention, the recording medium is not limited to a magnetic medium but may be of some different kind such as an optical disc. The recording or reproducing means may be composed of rotary heads like in the case of a VTR. In this specific embodiment, the above stated first signal generating means for generating the first signal every time the rotation comes to a predetermined phase is arranged in the form of the PG coil 21 and the wave form shaping circuit 22. However, the first signal generating means may be arranged to generate a signal every time the rotation of the rotary head comes to a predetermined phase in case where recording or reproduction is arranged to be performed by a rotary head like in the case of a VTR. The reference signal generating means for generating a reference signal for controlling the above stated rotation is arranged in the form of the reference signal generator 19. The first control means for controlling the above stated rotation by comparing the phase of the first signal with that of the reference signal is arranged in the form of the motor control circuit 23. The secondond control means for controlling the action of the recording or reproducing means by counting the reference signal is arranged in the form of the CPU 40 which performs the flow of operation at the steps #D-21 to #D-23 as shown in FIG. 8A.

Further, this embodiment operates, on the basis of the result of discrimination made by discriminating means which discriminates the kind of information recorded in each of the blocks of the storage means, either in the first control mode in which change-over between the first and secondond reproducing modes is automatically effected and the secondond control mode in which the secondond reproducing mode is selected. The first reproducing mode thus can be arranged to be not arbitrarily selectable.

In other words, an apparatus like this embodiment has a first recording or reproducing mode in which plurality of blocks are alternately used for recording or reproduction and a secondond recording or reproducing mode in which one of the plurality of blocks is continuously used for reproduction. For example, one is a frame recording/reproducing mode in which each of two tracks having one of two interlaced field video signals is subjected to recording or reproduction alternately with the other. The other mode is a field recording/reproducing mode in which only one of the two tracks is subjected to recording or reproduction. In recording, identification codes are added to still picture signals to permit a discrimination at the time of reproduction between a block (or track) having the signal recorded in the frame recording mode and another block having the signal recorded in the field recording mode. In reproducing, change-over is automatically effected between a field reproduction mode and a frame reproduction mode by making a discrimination between these identification codes. However, this arrangement has presented the following program: With such automatic changeover arranged to be always indiscriminately effected, reproduction would be undesirably performed, for example, in the frame reproduction mode even in cases where the field reproduction mode is preferable in carrying out, for example, high speed continuous reproduction or high speed electrical transmission of the signal recorded on the magnetic sheet.

Conceivable solutions of this problem include a method of changing the field and frame reproduction modes from one over to the other by manual changeover means. However, in accordance with this method, separately recorded field video signals which are not interlaced would be reproduced in the form of a frame video signal.

These problems have been not limited to the apparatuses for recording or reproducing a still picture signal but are common problems with all the apparatuses of the kind having a first reproducing mode in which records in at least two of the above stated plurality of blocks are alternately reproduced and a secondond reproducing mode in which the record of only one of the plurality of blocks is continuously reproduced.

This embodiment is a reproducing apparatus capable of reproducing information from storage means on which the information is recorded in a plurality of blocks without incurring these problems. The embodiment comprises first change-over means for effecting change-over between a first reproducing mode in which the records of at least two of the plurality of blocks are alternately reproduced and a secondond reproducing mode in which the record of only one of the plurality of blocks is continuously reproduced; discriminating means for discriminating the kind of information recorded in each of these blocks; and secondond change-over means for effecting changeover between a first control mode in which the first change-over means is controlled on the basis of the result of discrimination made by the discriminating means and a secondond control mode in which the first changeover means is shifted into the secondond reproduction mode irrespectively of the result of discrimination made by the discriminating means. With the embodiment arranged in this manner, it operates either in the first control mode in which the first and secondond reproduction modes are automatically changed from one over to the other on the basis of the result of discrimination made by the means for discriminating the kind of the recorded information or in the secondond control mode in which the apparatus is shifted to the secondond reproduction mode. The first reproduction mode is thus arranged to be not arbitrarily selectable. Therefore, this arrangement of the embodiment precludes the possibility of erroneous selection of the first reproduction mode. Further, In this embodiment, when the first change-over means is set for change-over between the first reproduction mode in which the records of at least two of the plurality of blocks are alternately reproduced and the secondond reproduction mode in which the record of only one of the plurality of blocks is continuously reproduced, field reproduction is performed. If the first change-over means is not set, the field flag is cleared for frame reproduction. The discriminating means for discriminating the kind of the information recorded in the blocks is arranged to be the steps #D-9 to #D-15 shown in FIG. 5.

The secondond change-over means for effecting the change-over between the first control mode in which the first change-over means is controlled on the basis of the result of discrimination by the discriminating means and the secondond control mode in which the first change-over means is shifted into the secondond reproduction mode irrespectively of the result of discrimination is arranged to include the start switch 60 for the programed reproduction or the interval reproduction for which the field reproduction mode and the frame reproduction mode are automatically changed from one over to the other by setting or clearing the field flag on the basis of the result of discrimination made at the steps #9 to #15 and also the field/frame selection or setting switch 59 which is arranged to have field reproduction performed by setting the field flag irrespectively of the result of discrimination made at the steps #9 to #15.

In this embodiment, a mode in which the apparatus operates in response to an external trigger signal can be set by utilizing the the interval time setting means. This arrangement enhances the operability of the apparatus.

The conventional apparatuses for reproducing information from storage means having the information recorded in each of a plurality of blocks therein include apparatuses of the kind arranged to reproduce information which is, for example, to be printed with a printer from the blocks by changing the reproducing blocks from one block over to another in response to a trigger signal coming from the printer. In the apparatus of this kind, for renewing the reproducing block in synchronism with an external device such as a printer arranged to supply the trigger signal, the block renewing mode is generally set by means of an additional switch which is provided specially for this purpose. However, this switch is not necessary for any purpose other than synchronization with the external device. The conventional setting method thus has room for improvement in cases where the reproducing apparatus is often not operated in synchronism with an external device. Whereas, in accordance with the arrangement of this embodiment, such an external trigger mode can be set by using the interval time setting means, so that the structural arrangement of the apparatus can be simplified.

With this invention applied to a recording/reproducing apparatus having both the recording and reproducing functions as described in the foregoing, when a reproduction preparing action begins, the embodiment is set into the reproducing mode in which the record block to be reproduced is automatically renewed. This arrangement facilitates a look-up operation for the operator.

The means for starting the reproduction preparing action is arranged to be the means for effecting a power supply to the apparatus in response to an operation on the power supply switch. However, the starting means may be arranged to be change-over means for changing the recording mode over to the reproduction mode in stead of the power supply means or may be means for actuating applicable circuit parts by detecting insertion of the magnetic sheet 1 into the slot shown in FIG. 3.

In the embodiment, the change-over means for change-over between a first reproduction mode in which reproduction is performed by automatically renewing the record block to be reproduced and the secondond reproduction mode in which the record block to be reproduced is not renewed is arranged to be the steps #D-21 to -33 of the subroutine (D) whereby the track feeding speed is controlled according to a track feed speed setting value obtained by the subroutine (F) called when the track feed speed setting switch 56 is turned on. However, the track feed speed setting method may be replaced with, for example, a method of directly setting it by means of a ten-key arrangement or some other suitable method.

When the reproduction preparing action is initiated by the reproduction preparation starting means, the control means for setting the above stated change-over means into the first reproduction mode is arranged to obtain in response to switching on of the power supply a track feed speed setting value for two pictures per second as shown at the step #1 in FIG. 5. However, the setting value may be any value that is other then a setting value for single performance requiring no renewal of the record block to be reproduced.

When the reproduction preparing action begins with the power supply switched on, the embodiment is set, as mentioned in the foregoing, into the first reproduction mode for performing reproduction by automatically renewing the record block to be reproduced. Therefore, tracks are automatically shifted with the track UP switch 54 or the track DOWN switch 55 operated. Compared with a case where the secondond reproduction mode in which the record block to be reproduced is not automatically renewed is selected at the start of preparation for reproduction, the arrangement of this embodiment greatly facilitates a loop-up operation for the operator.

What is claimed is:

1. A control device for a recording apparatus including, as one recording unit, a first recording mode for recording an image information as one picture and a second recording mode for recording a larger amount of image information as one picture than the image information of said first recording mode, comprising:
   a) control means for repeating said first recording mode or said second recording mode to record a predetermined number of pictures per unit of time;
   b) setting means for setting a number of pictures to be recorded per unit of time;
   c) means for discriminating whether or not the number of pictures to be recorded per unit of time set by said setting means is inoperable in the second recording mode; and
   d) means for changing the number of pictures to be recorded per unit of time set by said setting means, depending upon that said discriminating means discriminates the number set by said setting means being inoperable.

2. A device according to claim 1, wherein said information is a video signal, and said first recording mode is a field recording mode, and said second recording mode is a frame recording mode.

3. A device according to claim 1, wherein said changing means is arranged to set a maximum number of pictures among the number of pictures per unit of time operable at the time of changing the number of pictures to be recorded per unit of time in the second recording mode.

4. A device according to claim 1, further comprising:
   selecting means for selecting said first recording mode and said second recording mode.

5. A device according to claim 4, wherein said selecting means is arranged to select either said first recording mode or said second recording mode in response to a manual operation.

6. A recording device according claim 1 wherein said setting means is arranged to set said number of pictures in response to a manual operation.

7. A method of control for a recording apparatus including, as one recording unit, a first recording mode for recording an image information as one picture and a second recording mode for recording a larger amount of image information as one picture than the image information of said first recording mode, comprising:

a) repeating said first recording mode or said second recording mode to record a predetermined number of pictures per unit of time;
b) setting a number of pictures to be recorded per unit of time;
c) discriminating whether or not the number of pictures to be recorded per unit of time set by said setting means is inoperable in the second recording mode; and
d) changing the number of pictures to be recorded per unit of time set in said setting step, depending upon that said discriminating step discriminates the number set by said setting step being inoperable.

8. A method according to claim 7, wherein said information is a video signal, and said first recording mode is a field recording mode, and said second recording mode is a frame recording mode.

9. A method according to claim 7, wherein said changing step sets a maximum number of pictures among the number of pictures per unit of time operable at the time of changing the number of pictures to be recorded per unit of time in the second recording mode.

10. A method according to claim 7, further comprising
selecting said first recording mode and said second recording mode.

11. A method according to claim 10, wherein said selecting step selects either said first recording mode or said second recording mode in response to a manual operation.

* * * * *

UNITED STATES PATENT AND TRADEMARK OFFICE
CERTIFICATE OF CORRECTION

PATENT NO. : 5,379,158

DATED : January 3, 1995　　　　　Page 1 of 4

INVENTOR(S) : Shigeo Yamagata et al.

It is certified that error appears in the above-identified patent and that said Letters Patent is hereby corrected as shown below:

Col. 1, line 55.　Change "not can" to -- cannot --.

Col. 2, line 40.　Delete "of".

Col. 7, line 59.　After "access" insert -- , --.

Col. 8, line 58.　Change "sec" to -- seconds --.

Col. 9, line 55.　Change "secondonds" to -- seconds --.

Col. 10, line 30.　Change "described" to -- describe --.

Col. 11, line 13.　Change "secondond" to -- second --.

Col. 11, line 17.　Change "secondond" to -- second --.

Col. 11, line 19.　Change "secondond" to -- second --.

Col. 12, line 51.　Change "(two secondonds)" to -- (two seconds) --.

Col. 13, line 53.　Change "(two secondonds)" to -- (two seconds) --.

Col. 14, line 45.　Change "Contrarily" to -- Contrary --.

Col. 14, line 54.　Change ""0011"0" to -- "0011" --.

Col. 14, line 60.　Change "N+i" to -- N+1 --.

Col. 15, line 68.　Change "N+i" to -- N+1 --.

Col. 19, line 5.　Delete "of".

UNITED STATES PATENT AND TRADEMARK OFFICE
CERTIFICATE OF CORRECTION

PATENT NO. : 5,379,158

DATED : January 3, 1995

INVENTOR(S) : Shigeo Yamagata et al.

It is certified that error appears in the above-identified patent and that said Letters Patent is hereby corrected as shown below:

Col. 19, line 32. Delete "of".

Col. 19, line 45. After "FIG.11." insert -- In --.

Col. 20, line 5. Change "become" to -- becomes 10, the --.

Col. 20, line 7. Change "secondonds" to -- seconds --.

Col. 21, line 30. Change "⸮D-20" to -- #D-20 --.

Col. 25, line 36. Change "secondond" to -- second --.

Col. 25, line 41. Change "With" to -- When --.

Col. 26, line 62. Change "indicates" to -- indicate --.

Col. 28, line 38. Delete "the" (second occurrence).

Col. 29, line 54. Change "secondond" to -- second --.

Col. 29, line 56. Change "secondond" to -- second --.

Col. 30, line 3. Change "secondond" to -- second --.

Col. 30. line 17. After "in" insert -- a --.

Col. 30, line 32. Delete "an".

Col 32, line 47. Change "secondond" to -- second --.

Col. 33, line 15. Change "case" to -- cases --.

UNITED STATES PATENT AND TRADEMARK OFFICE
CERTIFICATE OF CORRECTION

PATENT NO. : 5,379,158

DATED : January 3, 1995

INVENTOR(S) : Shigeo Yamagata et al.

It is certified that error appears in the above-identified patent and that said Letters Patent is hereby corrected as shown below:

Col. 33, line 35. Change "secondond" to -- second -- and change "modes" to -- mode --.

Col. 33, line 36. Change "secondond" to -- second --.

Col. 33, line 37. Change "secondond" to -- second --.

Col. 33, line 43. Change "secondond" to -- second --.

Col. 34, line 13. Change "secondond" to -- second --.

Col. 34, line 23. Change "secondond" to -- second --.

Col. 34, line 27. Change "secondond" to -- second --.

Col. 34, line 31. Change "secondond" to -- second --.

Col. 34, line 33. Change "secondond" to -- second --.

Col. 34, line 34. Change "tively" to -- tive --.

Col. 34, line 37. Change "secondond" to -- second --.

Col. 34, line 40. Delete "the".

Col. 34, line 41. Change "secondond" to -- second --.

Col. 34, line 42. Change "secondond" to -- second --.

Col. 34, line 47. Change "In" to -- in --.

Col. 34, line 51. Change "secondond" to -- second --.

UNITED STATES PATENT AND TRADEMARK OFFICE
CERTIFICATE OF CORRECTION

PATENT NO. : 5,379,158
DATED : January 3, 1995
INVENTOR(S) : Shigeo Yamagata et al.

It is certified that error appears in the above-identified patent and that said Letters Patent is hereby corrected as shown below:

Col. 34, line 56. Delete "the".

Col. 34, line 59. Change "secondond" to -- second --.

Col. 34, line 63. Change "secondond" to -- second --.

Col. 34, line 64. Change "secondond" to -- second --.

Col. 34, line 65. Change "irrespectively" to -- irrespective --.

Col. 35, line 6. Change "irrespectively" to -- irrespective --.

Col. 35, line 10. Delete "the" (second occurrence).

Col. 35, line 45. Change "in" to -- instead --.

Col. 35, line 46. Delete "stead".

Col. 35, line 56. Change "secondond" to -- second --.

Signed and Sealed this

Eleventh Day of April, 1995

Attest:

BRUCE LEHMAN

*Attesting Officer*     *Commissioner of Patents and Trademarks*